US009125212B2

United States Patent
Yasuoka

(10) Patent No.: US 9,125,212 B2
(45) Date of Patent: Sep. 1, 2015

(54) APPARATUS AND METHOD FOR SWITCHING A WIRELESS COMMUNICATION SCHEME

(71) Applicant: FUJITSU LIMITED, Kawasaki-shi, Kanagawa (JP)

(72) Inventor: Hirotomo Yasuoka, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 147 days.

(21) Appl. No.: 13/954,419

(22) Filed: Jul. 30, 2013

(65) Prior Publication Data

US 2014/0073344 A1    Mar. 13, 2014

(30) Foreign Application Priority Data

Sep. 7, 2012   (JP) ................................ 2012-197391

(51) Int. Cl.
*H04W 72/04* (2009.01)
*H04W 48/18* (2009.01)
*H04W 88/06* (2009.01)

(52) U.S. Cl.
CPC .......... *H04W 72/0486* (2013.01); *H04W 48/18* (2013.01); *H04W 88/06* (2013.01)

(58) Field of Classification Search
CPC .. H04W 72/0486; H04W 48/18; H04W 88/06
USPC ........................................................ 455/453
See application file for complete search history.

(56) References Cited

U.S. PATENT DOCUMENTS

2013/0137423 A1*   5/2013   Das et al. ................... 455/426.1

FOREIGN PATENT DOCUMENTS

JP    2003-125450 A    4/2003

OTHER PUBLICATIONS

3rd Generation Partnership Project; Technical Specification Group Radio Access Network; Radio Resource Control (RRC); Protocol specification (Release 11); 3GPP TS 25.331 V11.2.0; Jun. 2012.

* cited by examiner

*Primary Examiner* — Chuong A Ngo
(74) *Attorney, Agent, or Firm* — Arent Fox LLP

(57) ABSTRACT

In a wireless communication system, a mobile station performs communication by means of first and second wireless communication schemes, and a base station communicates with the mobile station. The base station estimates communication loads of the first and second wireless communication schemes on the basis of a number of times communication is performed by an automatic call from the mobile station and a maximum number of times communication is able to be performed by the automatic call. The base station notifies the mobile station of one of the first and second wireless communication schemes having the low communication load estimated, and the mobile station uses the one of the first and second wireless communication schemes notified by the base station in a standby state caused by the automatic call.

10 Claims, 17 Drawing Sheets

FIG. 10A

| BASE STATION NUMBER | BASE STATION COMMUNICATION COUNT |
|---|---|
| 1 | 1000 |
| 2 | 200 |
| 3 | 800 |
| ... | ... |
| 255 | 1500 |
| ... | ... |

| CN MAXIMUM CAPACITY |
|---|

| DIFFERENT-RAT MAXIMUM POSSIBLE COMMUNICATION COUNT |
|---|
| DIFFERENT-RAT COMMUNICATION COUNT |

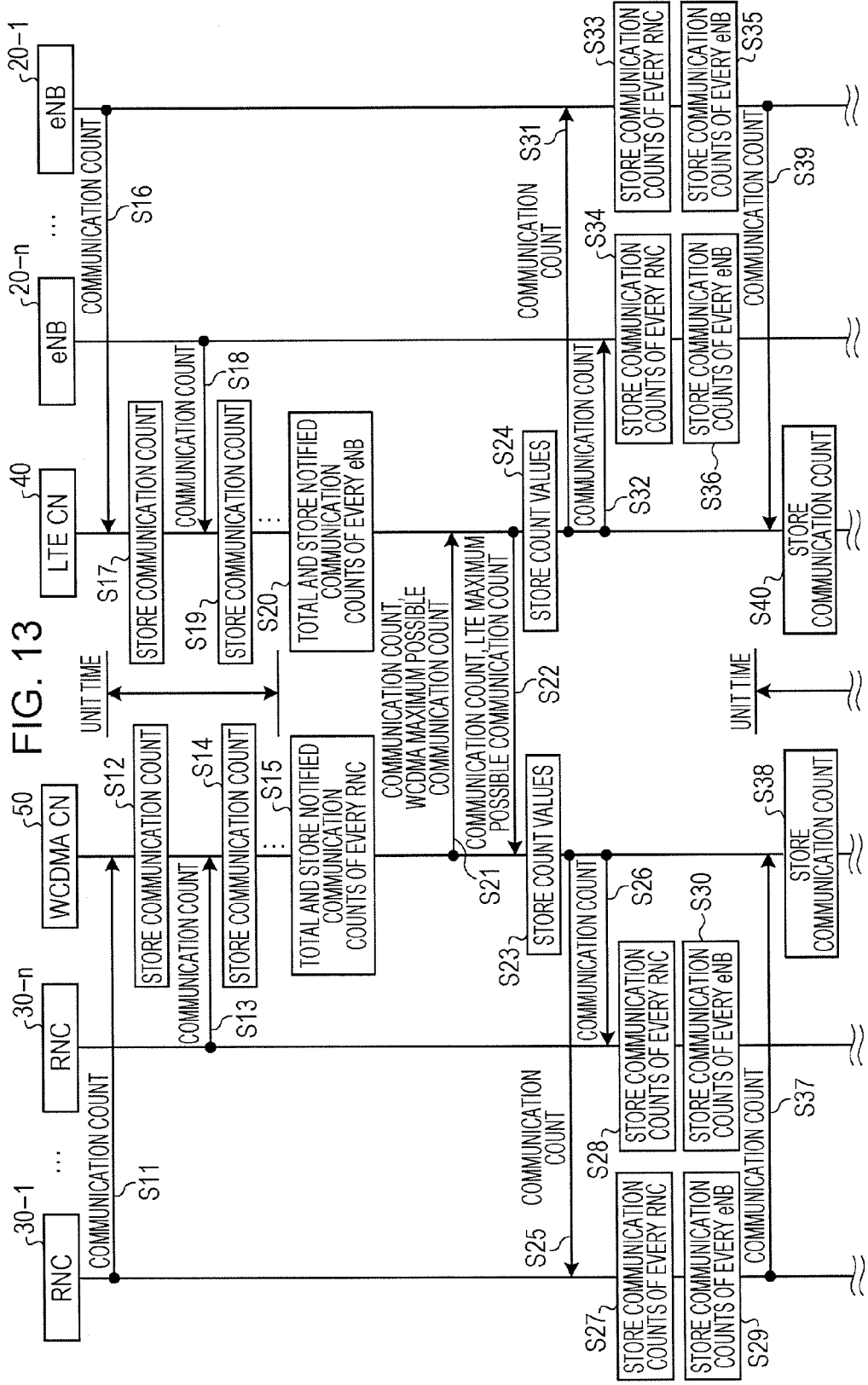

FIG. 14

| IE/Group Name | Presence |
|---|---|
| Message Type | M |
| Message ID | M |
| DEVICE STATUS | M |
| BASE STATION COMMUNICATION COUNT | O |

FIG. 15

| IE/Group Name | Presence |
|---|---|
| Message Type | M |
| Message ID | M |
| DEVICE STATUS | M |
| MAXIMUM POSSIBLE COMMUNICATION COUNT | O |
| CURRENT COMMUNICATION COUNT | O |

FIG. 16

| IE/Group Name | Presence |
|---|---|
| Message Type | M |
| Message ID | M |
| DEVICE STATUS | M |
| WCDMA MAXIMUM POSSIBLE COMMUNICATION COUNT | O |
| WCDMA COMMUNICATION COUNT | O |
| LTE MAXIMUM POSSIBLE COMMUNICATION COUNT | O |
| LTE COMMUNICATION COUNT | O |

FIG. 19

```
EstablishmentCause ::=    ENUMERATED {
                              originatingConversationalCall,
                              originatingStreamingCall,
                              originatingInteractiveCall,
                              originatingBackgroundCall,
                              originatingSubscribedTrafficCall,
                              terminatingConversationalCall,
                              terminatingStreamingCall,
                              terminatingInteractiveCall,
                              terminatingBackgroundCall,
                              emergencyCall,
                              interRAT-CellReselection,
                              interRAT-CellChangeOrder,
                              registration,
                              detach,
                              originatingHighPrioritySignalling,
                              originatingLowPrioritySignalling,
                              callRe-establishment,
                              terminatingHighPrioritySignalling,
                              terminatingLowPrioritySignalling,
                              terminatingCauseUnknown,
                              mbms-Reception,
                              mbms-PTP-RB-Request,
                              delayTolerantAccess,
                      C1 ─┤ spare9,
                              spare8,
                              spare7,       ADD NEW cause INDICATING
                              spare6,            "AUTOMATIC CALL"
                              spare5,
                              spare4,
                              spare3,
                              spare2,
                              spare1 }
```

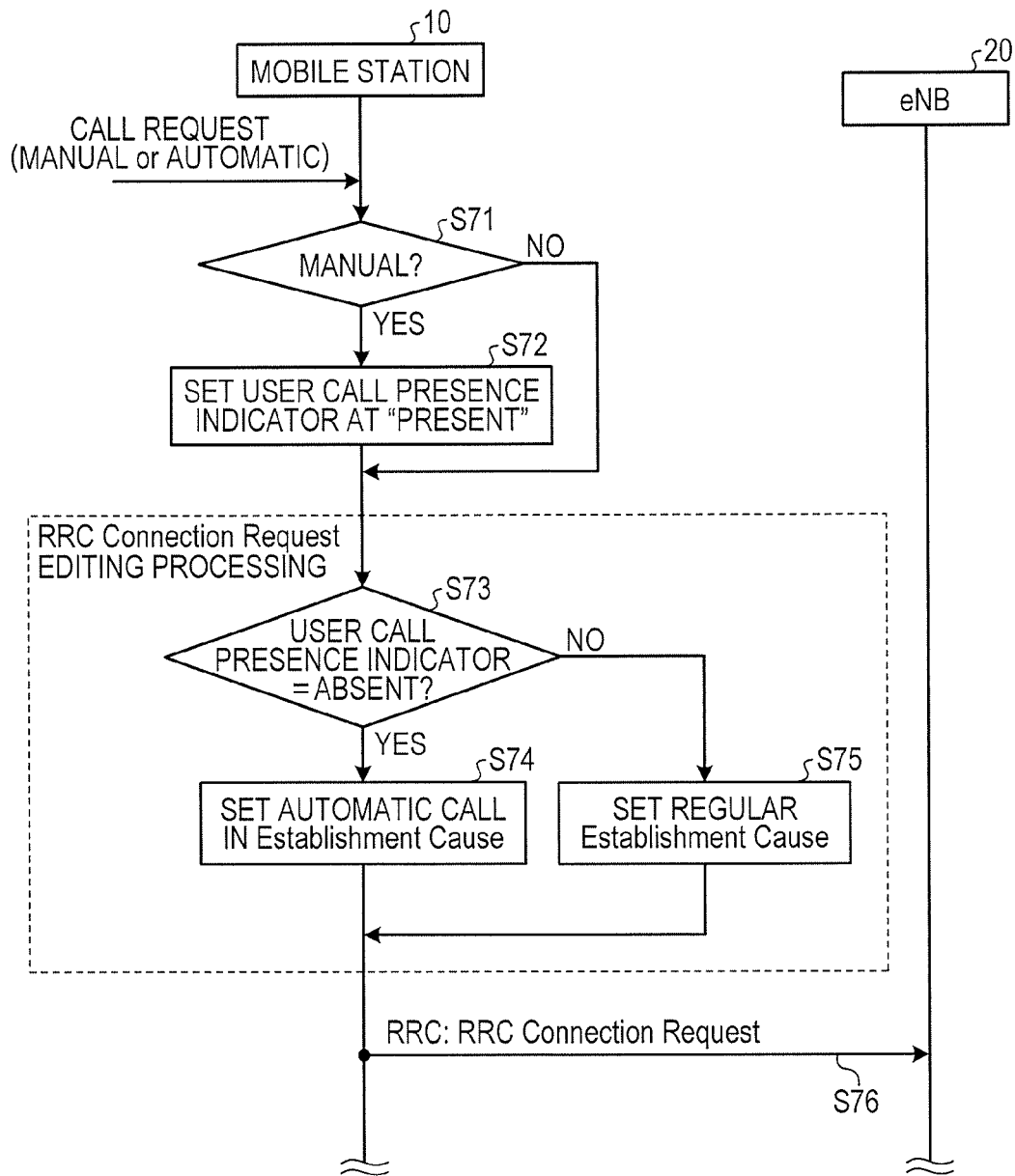

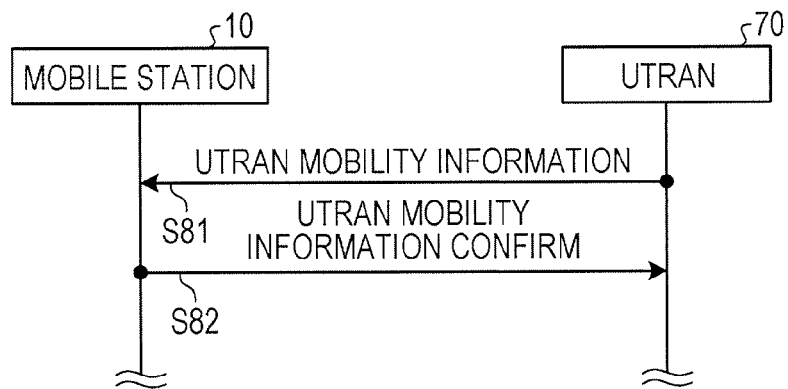
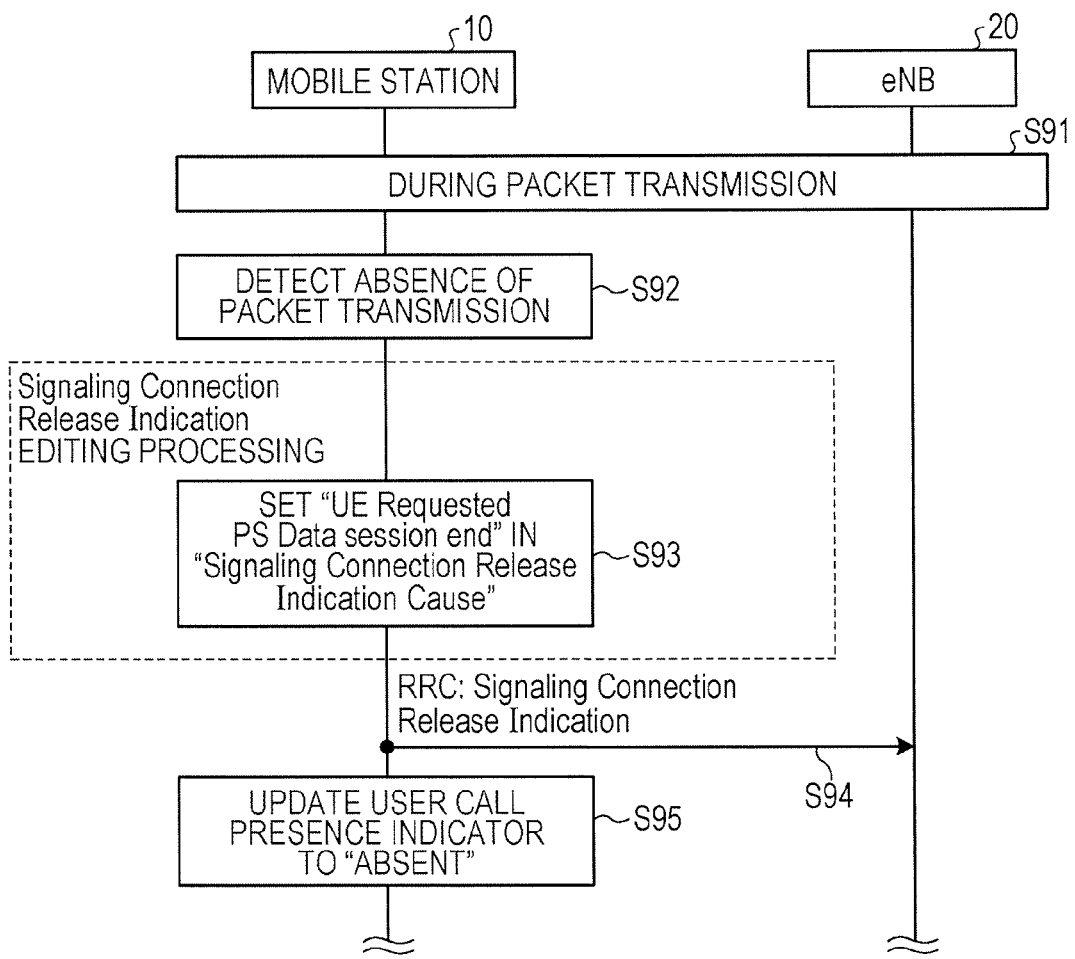

FIG. 23

| COMMUNICATION START RAT | CALL METHOD | CALL TYPE | LOAD STATUS | WIRELESS SWITCHING FUNCTION | STANDBY RAT CHANGE |
|---|---|---|---|---|---|
| WCDMA | AUTOMATIC | PACKET | WCDMA<LTE | ABSENT | ABSENT |
| WCDMA | MANUAL | PACKET | WCDMA<LTE | PRESENT | ABSENT |
| WCDMA | AUTOMATIC | PACKET | WCDMA≥LTE | PRESENT | WCDMA→LTE |
| WCDMA | MANUAL | PACKET | WCDMA≥LTE | PRESENT | WCDMA→LTE |
| LTE | AUTOMATIC | PACKET | WCDMA>LTE | ABSENT | ABSENT |
| LTE | MANUAL | PACKET | WCDMA>LTE | ABSENT | ABSENT |
| LTE | AUTOMATIC | PACKET | WCDMA≤LTE | ABSENT | LTE→WCDMA |
| LTE | MANUAL | PACKET | WCDMA≤LTE | ABSENT | LTE→WCDMA |
| WCDMA | AUTOMATIC | VOICE | NOT POSSIBLE | NOT POSSIBLE | NOT POSSIBLE |
| WCDMA | MANUAL | VOICE | LOAD STATUS NOT REFERENCED | ABSENT | ABSENT |
| LTE | AUTOMATIC | VOICE | NOT POSSIBLE | NOT POSSIBLE | NOT POSSIBLE |
| LTE | MANUAL | VOICE | LOAD STATUS NOT REFERENCED | PRESENT (CS Fallback) | ABSENT |

APPARATUS AND METHOD FOR SWITCHING A WIRELESS COMMUNICATION SCHEME

CROSS-REFERENCE TO RELATED APPLICATION

This application is based upon and claims the benefit of priority from the prior Japanese Patent Application No. 2012-197391, filed on Sep. 7, 2012, the entire contents of which are incorporated herein by reference.

FIELD

The embodiment discussed herein is related to apparatus and method for switching a wireless communication scheme.

BACKGROUND

Up to the present day, together with the development of wireless communication technology, Long Term Evolution (LTE) has become widespread as a new wireless communication standard as an alternative to Wideband Code Division Multiple Access (WCDMA). A mobile station such as a mobile telephone connects to a base station that supports a wireless communication scheme such as WCDMA and LTE, and communicates with another mobile station. These kinds of wireless communication schemes are referred to as radio access technology (RAT), and among mobile stations there is also a mobile station (hereafter denoted as a "dual terminal") with which communication by means of a plurality of different RATs is possible. A home subscriber server (HSS), which is a higher-level device of the base station, determines a RAT to be used by the dual terminal for standby, in accordance with the contractual information and capacity of the dual terminal (whether or not LTE is supported, for example). When the dual terminal receives notification of the determined RAT from the connection-destination base station, the dual terminal performs a standby process using the RAT designated by the base station, out of a plurality of available RATs. Japanese Laid-open Patent Publication No. 2003-125450 and 3rd Generation Partnership Project (3GPP) Technical Specification (TS) 25.331 V11.2.0 (2012-June) 8.1.3.3 are examples of related art.

SUMMARY

According to an aspect of the invention, a system includes a mobile station and a base station. The mobile station performs communication by means of first and second wireless communication schemes, and the base station communicates with the mobile station. The base station estimates communication loads of the first and second wireless communication schemes on the basis of a communication count indicating a number of times communication is performed by an automatic call from the mobile station and a maximum possible communication count indicating a maximum number of times communication is able to be performed by the automatic cal. The base station notifies, to the mobile station, a priority communication scheme that is one of the first and second wireless communication schemes having a low communication load between the estimated loads, and the mobile station uses the priority communication scheme notified by the base station in a standby state caused by the automatic call.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 10A is a diagram illustrating an example of a base station communication count, according to an embodiment;

FIG. 10B is a diagram illustrating an example of a CN maximum capacity, according to an embodiment;

FIG. 10C is a diagram illustrating an example of a different-RAT communication state, according to an embodiment;

FIG. 13 is a diagram illustrating an example of an operational sequence for communication count totaling processing, according to an embodiment;

FIG. 14 is a diagram illustrating an example of a node health check signal, according to an embodiment;

FIG. 15 is a diagram illustrating an example of a node health check signal, according to an embodiment;

FIG. 16 is a diagram illustrating an example of a node health check signal, according to an embodiment;

FIG. 19 is a diagram illustrating an example of information indicating a cause specifying an automatic call, according to an embodiment;

FIG. 20 is a diagram illustrating an example of an operational flowchart for a mobile station, according to an embodiment;

FIG. 21 is a diagram illustrating an example of an operational sequence for a mobile station, according to an embodiment;

FIG. 22 is a diagram illustrating an example of an operational sequence for a mobile station, according to an embodiment; and FIG. 23 is a diagram illustrating an example of a manner in which a wireless switching function and change of a standby RAT are performed, according to an embodiment.

DESCRIPTION OF EMBODIMENT

However, in recent years, the amount of wireless communication has sharply increased due to an increase in users of always-on terminals, which are a type of dual terminal. An always-on terminal is a terminal that typically maintains itself in a state of operation to thereby issue autonomous calls (automatic calls) in order to update various applications in the terminal, regardless of call requests from the user. When the standby RAT for an always-on terminal is WCDMA, calls from the terminal are processed by a WCDMA-side base station and a core network (CN), regardless of whether the calls are calls from users or automatic calls. Therefore, there is a possibility that user calls such as voice calls and packet calls that are fundamentally to be continued may be lost or restricted due to congestion caused by the increase in automatic calls. Furthermore, dual terminals perform switching control that prioritizes LTE over WCDMA, in accordance with the 3GPP TS 25.331 standard, for example. Furthermore, with dual terminals, because the LTE-side load is not taken into account when changing the RAT to LTE, there is a risk that a further increase in congestion will be caused, particularly when the LTE-side base station and CN are congested.

An embodiment of the base station, the wireless communication system, and the wireless communication method disclosed in the present application is hereafter described in detail with reference to the drawings. Furthermore, the base station, the wireless communication system, and the wireless communication method disclosed in the present application are not restricted by this embodiment.

Figure 1:
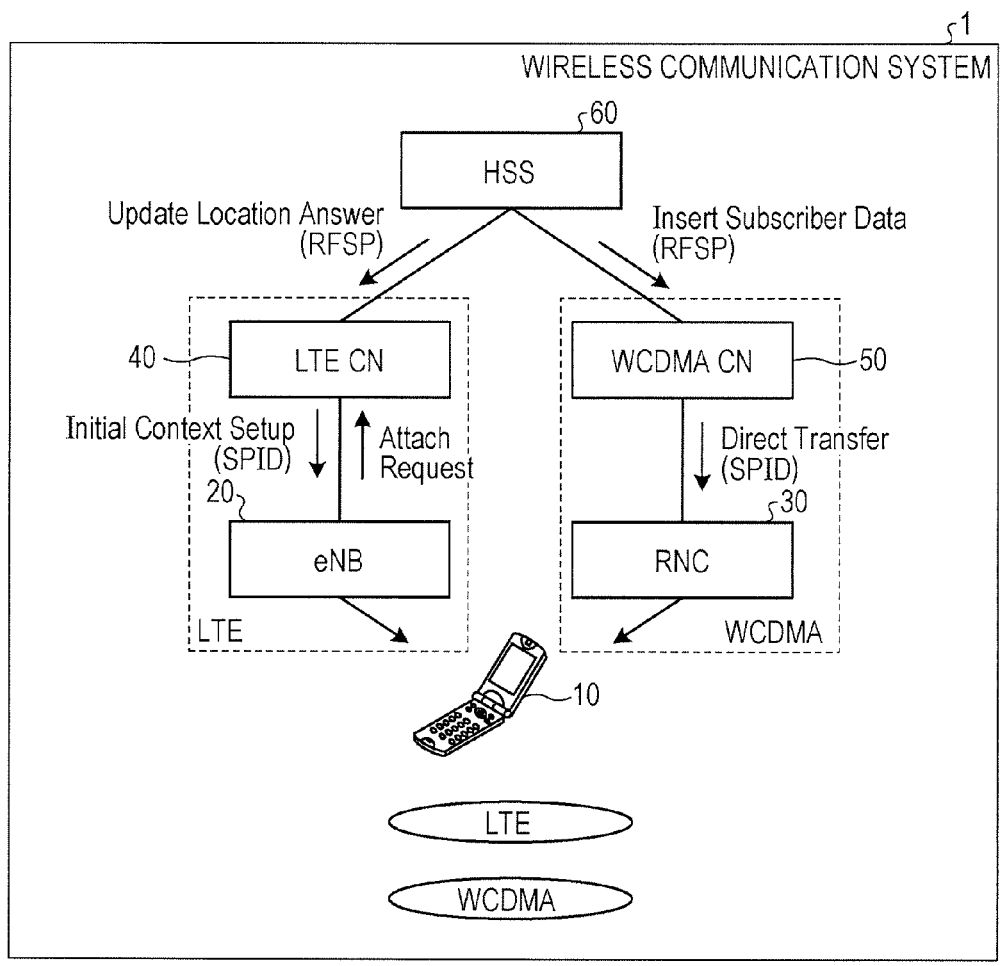
FIG. 1 is a diagram illustrating an example of a wireless communication system, according to an embodiment.

First, the configuration of a wireless communication system according to the embodiment disclosed in the present application will be described. FIG. 1 is a diagram illustrating an example of a wireless communication system, according to an embodiment. FIG. 1 illustrates the configuration of a wireless communication system 1. As depicted in FIG. 1, the wireless communication system 1 includes a mobile station (user equipment: UE) 10, an evolved Node B (eNB) 20, a radio network controller (RNC) 30, a Long Term Evolution core network (LTE CN) 40, a Wideband Code Division Multiple Access core network (WCDMA CN) 50, and a home subscriber server (HSS) 60 as a subscriber management device. The mobile station 10 is a dual terminal that supports both LTE and WCDMA RATs, and performs wireless communication such as transmitting and receiving radio resource control (RRC), with the eNB 20 and the RNC 30. Furthermore, the higher-level devices of the eNB 20, the RNC 30, the LTE CN 40, the WCDMA CN 50, and the HSS 60 are bi-directionally connected by wire in such a way that it is possible to transmit and receive various signals and data.

In addition, in the embodiment, the eNB 20 and the RNC 30 are devices that instruct a standby RAT for the mobile station 10, and therefore, in FIG. 1, depiction of a WCDMA-side base station is omitted, and it is assumed that the mobile station 10 is directly wirelessly connected to the RNC 30. However, without restriction to this kind of configuration, a wireless base station such as a Node B (NB) may be provided between the mobile station 10 and the RNC 30.

Figure 2:
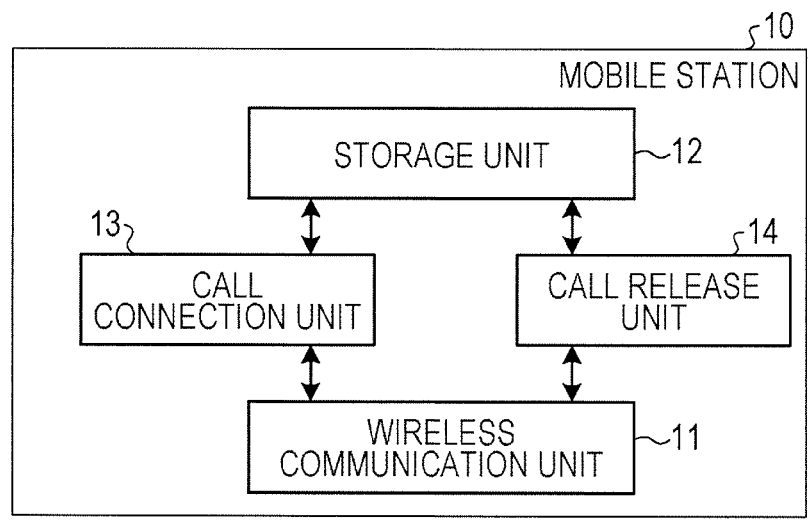
FIG. 2 is a diagram illustrating an example of a functional configuration of a mobile station, according to an embodiment.

The mobile station 10 is an always-on terminal, for example. The always-on terminal frequently accesses a network via the eNB 20 and the RNC 30 that operate as base stations, in order to automatically update various application programs in the terminal to new versions. The mobile station 10 issues automatic calls for updating the applications, in addition to user calls including regular packet calls and voice calls. FIG. 2 is a diagram illustrating an example of a functional configuration of a mobile station, according to an embodiment. As depicted in FIG. 2, the mobile station 10 includes a wireless communication unit 11, a storage unit 12, a call connection unit 13, and a call release unit 14. These components are connected unidirectionally or bidirectionally in such a way as to enable input and output of signals and data.

The wireless communication unit 11 communicates wirelessly with the eNB 20 and the RNC 30. For example, the wireless communication unit 11 transmits a "Signaling Connection Release Indication" as RRC to the eNB 20, and also receives "UTRAN MOBILITY INFORMATION" from the eNB 20. Furthermore, the wireless communication unit 11 transmits, to the RNC 30, a "RRC Connection Request" and "UTRAN MOBILITY INFORMATION Confirm" as RRC.

The storage unit 12 stores various information used in processing executed by the call connection unit 13 and the call release unit 14. For example, the storage unit 12 stores a user call presence indicator. In other words, the storage unit 12 stores "absent" as the user call presence indicator in the case of an automatic call issued by the mobile station 10, and on the other hand stores "present" as the user call presence indicator in the case where there is a call request from a user. Furthermore, the storage unit 12 stores arbitrary setting information and control information other than the aforementioned information.

Figure 3:
FIG. 3 is a diagram illustrating an example of a user call presence indicator, according to an embodiment.

FIG. 3 is a diagram illustrating an example of a user call presence indicator, according to an embodiment. FIG. 3 illustrates a user call presence indicator 121 stored in the storage unit 12 of the mobile station 10. The default value of the user call presence indicator 121 is "absent". The user call presence indicator 121 is set at "present" when there is a call request from a user of a mobile station, and is set at "absent" when the call is released. Furthermore, reference is made to the user call presence indicator 121 when RRC is transmitted.

The call connection unit 13 executes various processing involved in the transmission of a "RRC Connection Request", the reception of "UTRAN MOBILITY INFORMATION", and the transmission of a "UTRAN MOBILITY INFORMATION Confirm". For example, the call connection unit 13 performs various control operations with respect to information stored in the storage unit 12, such as referring to (reading), changing (writing), and erasing the information. When there is a call request from a user together with the transmission of a "RRC Connection Request", the call connection unit 13 causes "present" to be stored in the storage unit 12 as the user call presence indicator. When "absent" is stored as the user call presence indicator when the call connection unit 13 edits a "RRC Connection Request" message, the call connection unit 13 sets, in an "Establishment Cause", a "Cause" indicating "automatic call". On the other hand, when "present" is stored as the user call presence indicator, the call connection unit 13 performs regular editing processing for an "Establishment Cause".

The call release unit 14 performs terminal-side processing in the call release processing. For example, the call release unit 14 executes processing involved in the transmission of the "Signaling Connection Release Indication". The call release unit 14 performs various control operations with respect to information stored in the storage unit 12, such as referring to (reading), changing (writing), and erasing the information. When "present" is stored in the storage unit 12 as the user call presence indicator, the call release unit 14 updates "present" to "absent" when call release processing is performed.

Figure 4:
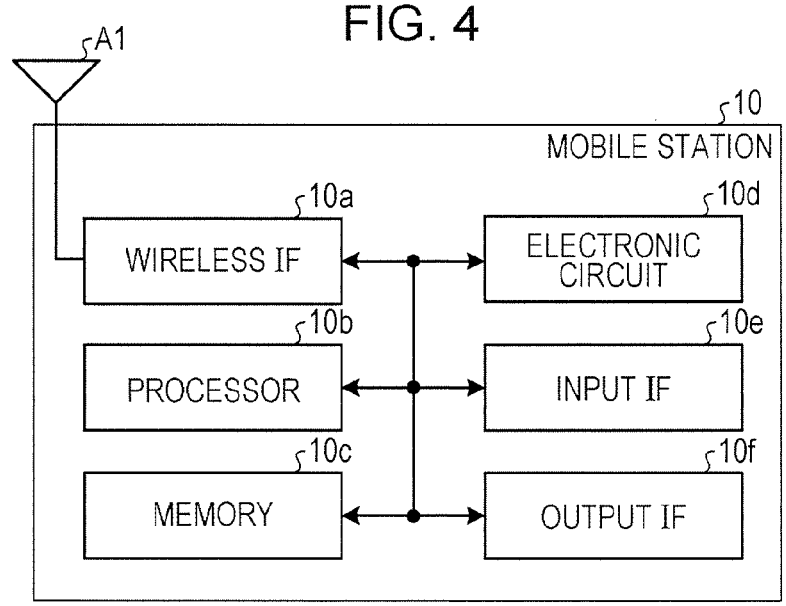
FIG. 4 is a diagram illustrating an example of a hardware configuration of a mobile station, according to an embodiment.

FIG. 4 is a diagram illustrating an example of a hardware configuration of a mobile station, according to an embodiment. As depicted in FIG. 4, the mobile station 10 includes, as hardware constituent elements, a wireless interface (IF) 10a, a processor 10b, a memory 10c, an electronic circuit 10d, an input IF 10e, and an output IF 10f. These constituent elements are connected unidirectionally or bidirectionally in such a way as to enable input and output of signals and data.

The wireless IF 10a is an interface device for performing wireless communication with the eNB 20 and the RNC 30, an example of which is an antenna A1. The processor 10b is a device that processes data, an example of which is a central processing unit (CPU), a digital signal processor (DSP), or the like. The memory 10c is a device that stores data, an example of which is RAM such as synchronous dynamic random access memory (SDRAM), read-only memory (ROM), or the like. An example of the electronic circuit 10d is a large-scale integration (LSI), a field-programmable gate array (FPGA), an application-specific integrated circuit (ASIC), or the like. The input IF 10e is a device that performs input to the mobile station 10, an example of which is an operation button, a microphone, or the like. The output IF 10f is a device that performs input from the mobile station 10, an example of which is a display, a speaker, or the like.

Furthermore, the corresponding relationships between the functional configuration and hardware configuration of the mobile station 10 are as follows: the wireless communication unit 11 is realized by means of the aforementioned wireless IF 10a and the electronic circuit 10d; the storage unit 12 is realized by means of the aforementioned memory 10c; the call connection unit 13 is realized by means of the aforementioned processor 10b and the electronic circuit 10d; and the call release unit 14 is realized by means of the aforementioned processor 10b and the electronic circuit 10d.

Figure 5:
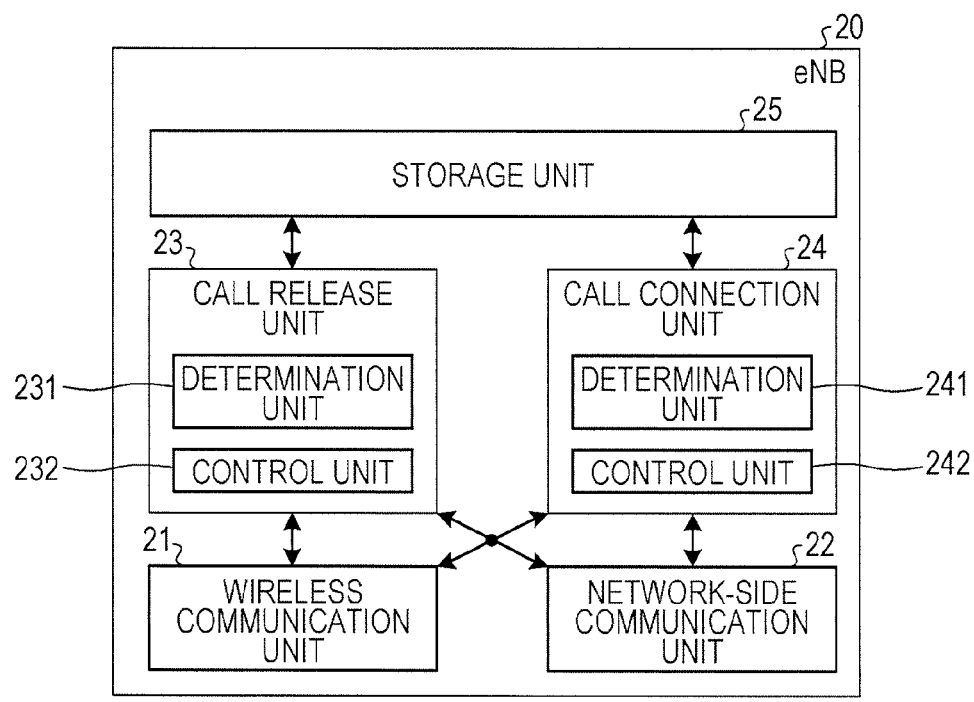
FIG. 5 is a diagram illustrating an example of a functional configuration of a wireless base station, according to an embodiment.

The eNB 20 is a wireless base station, for example. FIG. 5 is a diagram illustrating an example of a functional configuration of a wireless base station, according to an embodiment. As depicted in FIG. 5, the eNB 20 serving as a wireless base station includes communication unit 21, a network-side communication unit 22, a call release unit 23, a call connection unit 24, and a storage unit 25. The call release unit 23 includes a determination unit 231 and a control unit 232. Likewise, the call connection unit 24 includes a determination unit 241 and a control unit 242. These constituent elements are connected unidirectionally or bidirectionally in such a way as to enable input and output of signals and data.

The wireless communication unit 21 communicates wirelessly by means of LTE, with mobile stations including always-on terminals. For example, the wireless communication unit 21 receives a "Signaling Connection Release Indication", a "RRC Connection Request", and a "UTRAN MOBILITY INFORMATION Confirm" as RRC. Furthermore, the wireless communication unit 21 transmits "UTRAN MOBILITY INFORMATION" as RRC.

The network-side communication unit 22 performs wired communication with other eNBs and the LTE CN 40. The network-side communication unit 22 transmits and receives a "NODE HEALTH CHECK" with the LTE CN 40, for example.

The call release unit 23 performs base station-side processing in the call release processing. The call release unit 23 executes processing involved in the reception of a "Signaling Connection Release Indication", for example. The call release unit 23 performs various control operations with respect to information stored in the storage unit 25, such as referring to (reading), changing (writing), and erasing the information. The determination unit 231 determines whether or not the mobile station has automatically cut off communication, on the basis of a "Cause value" included in a "Signaling Connection Release Indication". For example, when the Cause value is "UE Requested PS Data session end", the determination unit 231 adds "1" to a "communication count" stored in the storage unit 25. The control unit 232 performs time period management for the "communication count" counted by the determination unit 231. The control unit 232 causes a cycle timer to start when a service is started by the eNB 20, and clears (updates to zero) the "communication count" each time a predetermined cycle T1 elapses.

The call connection unit 24 performs base station-side processing in call connection processing and in transmission and reception processing of signals between nodes. The call connection unit 24 executes processing involved in the reception of a "RRC Connection Request" and a "UTRAN MOBILITY INFORMATION Confirm", the transmission of "UTRAN MOBILITY INFORMATION", or the transmission and reception of a "NODE HEALTH CHECK", for example. The call connection unit 24 performs various control operations with respect to information stored in the storage unit 25, such as referring to (reading), changing (writing), and erasing the information.

The determination unit 241 determines whether or not the mobile station has automatically issued a call, on the basis of an "Establishment Cause value" included in a "RRC Connection Request". For example, when the mobile station 10 has automatically issued a call, the determination unit 241 provides notification of a "priority communication RAT" in the storage unit 25, as standby RAT information for the mobile station 10, to the mobile station 10 by means of "UTRAN MOBILITY INFORMATION", and thereby changes the RAT for the next time transmission occurs.

The call connection unit 24 controls the transmission of a "NODE HEALTH CHECK". The control unit 242 causes a cycle timer to start when a service is started by the eNB 20, and each time a predetermined cycle T2 elapses, sets the device status of the eNB 20 at "normal", and also sets the "communication count" in the storage unit 25. The control unit 242 instructs the network-side communication unit 22 to transmit a "NODE HEALTH CHECK" to the LTE CN 40. The control unit 242 controls the reception of a "NODE HEALTH CHECK", for example. When a "NODE HEALTH CHECK" is received from the LTE CN 40 after a service has been started by the eNB 20, the control unit 242 refers to the device status at that current point in time, and when the device status is set at "normal", the control unit 242 confirms whether or not an option parameter is present. The control unit 242 refers to the storage unit 25 and performs the calculations of "WCDMA communication count÷WCDMA maximum possible communication count=$\alpha$" and "LTE communication count÷LTE maximum possible communication count=$\beta$", and compares the magnitudes of $\alpha$ and $\beta$.

When the option parameter is present, the storage unit 25 stores each of the values of the "WCDMA maximum possible communication count", the "WCDMA communication count", the "LTE maximum possible communication count", and the "LTE communication count". The storage unit 25 stores, as the "priority communication RAT", information on the RAT (WCDMA or LTE) having the lower numerical value from between the α and β values.

Figure 6A:
FIG. 6A is a diagram illustrating an example of a base station communication count, according to an embodiment.

FIG. 6A is a diagram illustrating an example of a base station communication count, according to an embodiment. FIG. 6A illustrates a base station communication count 251 stored in the storage unit 25 of the eNB 20. The default value of the base station communication count 251 is "0". As examples of when the base station communication count 251 is set, the base station communication count 251 is incremented by 1 when a Signaling Connection Release Indication (SCRI) is received, and is cleared to "0" when the cycle timer reaches the end of a cycle. Furthermore, reference is made to the base station communication count 251 when a "NODE HEALTH CHECK" is transmitted to the LTE CN 40.

Figure 6B:
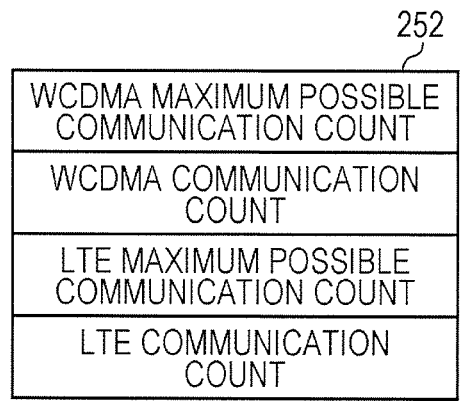
FIG. 6B is a diagram illustrating an example of a radio access technology (RAT) communication state, according to an embodiment.

FIG. 6B is a diagram illustrating an example of a RAT communication state, according to an embodiment. FIG. 6B illustrates a RAT communication state 252 stored in the storage unit 25 of the eNB 20. As depicted in FIG. 6B, the RAT communication state 252 includes the WCDMA maximum possible communication count, the WCDMA communication count, the LTE maximum possible communication count, and the LTE communication count. A maximum possible communication count is the maximum value for the number of times communication is permitted by the corresponding RAT, and a communication count is the number of times (actual value) communication has actually been performed using the corresponding RAT. The default value for the values stored in the areas making up the RAT communication state 252 is "0". The RAT communication state 252 is set and referenced when a "NODE HEALTH CHECK" transmitted from the LTE CN 40 is received.

Figure 6C:
FIG. 6C is a diagram illustrating an example of information on a priority communication RAT, according to an embodiment.

FIG. 6C is a diagram illustrating an example of information on a priority communication RAT, according to an embodiment. FIG. 6C illustrates a priority communication RAT 253 stored in the storage unit 25 of the eNB 20. The default value of the priority communication RAT 253 is "LTE" indicating the RAT of the eNB 20. Furthermore, in the case of the RNC 30, "WCDMA" indicating the RAT of the RNC 30 is stored as the default value. The priority communication RAT 253 is set when a "NODE HEALTH CHECK" transmitted from the LTE CN 40 is received. The RAT having the lower numerical value (the lower load) from between the α and β values is set for the priority communication RAT 253. Furthermore, reference is made to the priority communication RAT 253 upon reception of RRC automatically called by an always-on terminal.

Figure 7:
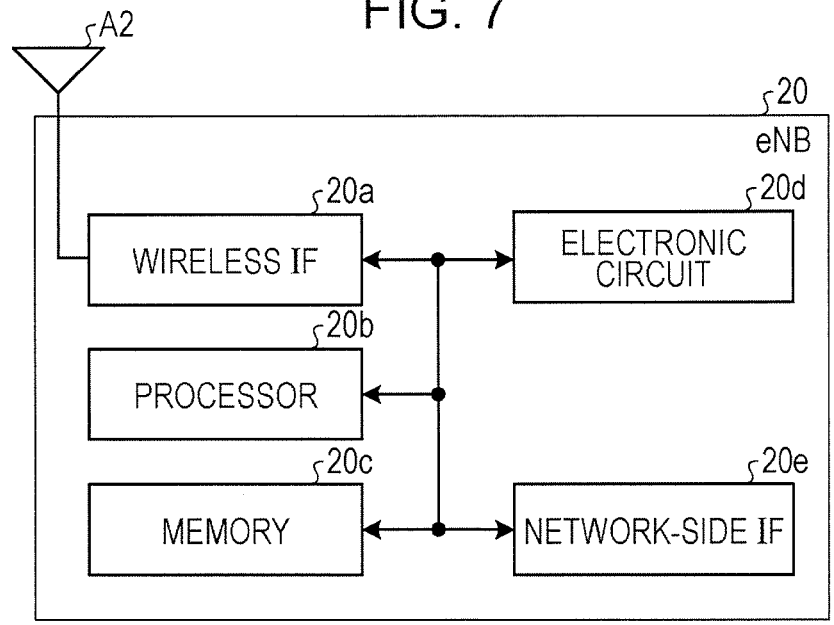
FIG. 7 is a diagram illustrating an example of a hardware configuration of an eNB, according to an embodiment.

FIG. 7 is a diagram illustrating an example of a hardware configuration of an eNB, according to an embodiment. FIG. 7 illustrates a hardware configuration of the eNB 20. As depicted in FIG. 7, the eNB 20 includes, as hardware constituent elements, a wireless IF 20a, a processor 20b, a memory 20c, an electronic circuit 20d, and a network-side IF 20e. These constituent elements are connected unidirectionally or bidirectionally in such a way as to enable input and output of signals and data.

The wireless IF 20a is an interface device for performing wireless communication with the mobile station 10, an example of which is an antenna A2. The processor 20b is a device that processes data, an example of which is a CPU, a DSP, or the like. The memory 20c is a device that stores data, an example of which is RAM, ROM, or the like. An example of the electronic circuit 20d is a LSI, a FPGA, an ASIC, or the like. The network-side IF 20e is an interface device for performing wired communication with another eNB or a higher-level device of a CN or the like, by way of a wired line connected to a network of a mobile telephone system.

Furthermore, the corresponding relationships between the functional configuration and hardware configuration of the eNB 20 are as follows: the wireless communication unit 21 is realized by means of the aforementioned wireless IF 20a and the electronic circuit 20d; the network-side communication unit 22 is realized by means of the aforementioned network-side IF 20e and the electronic circuit 20d; the call release unit 23 is realized by means of the processor 20b and the electronic circuit 20d; the call connection unit 24 is realized by means of the processor 20b and the electronic circuit 20d; and the storage unit 25 is realized by means of the aforementioned memory 20c.

The configuration of the eNB 20 has been representatively described above, and the functional configuration of the RNC 30 is the same as the functional configuration of the eNB 20 except for the point that the RAT is WCDMA. Accordingly, reference numerals having the same endings are appended to common constituent elements, and also depictions and detailed descriptions thereof have been omitted here. To be specific, a wireless communication unit 31, a network-side communication unit 32, a call release unit 33, a call connection unit 34, and a storage unit 35 of the RNC 30 are constituent elements respectively corresponding to the wireless communication unit 21, the network-side communication unit 22, the call release unit 23, the call connection unit 24, and the storage unit 25 of the eNB 20. When a determination unit 341 of the call connection unit 34 determines that the mobile station 10 has issued an automatic call, and determines that the "priority communication RAT" is "WCDMA" as a result of referring to the "priority communication RAT" in the storage unit 35, the wireless communication switching function is not performed, and transmission processing by WCDMA is continued.

Figure 8:
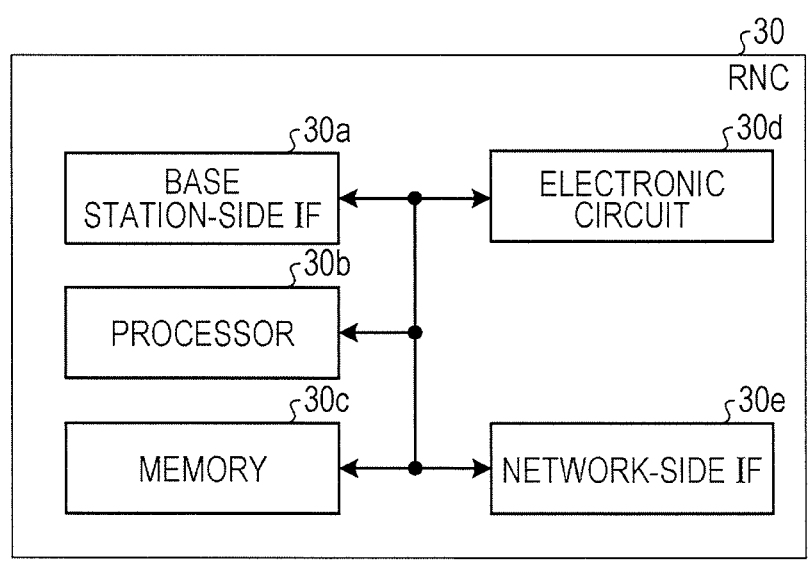
FIG. 8 is a diagram illustrating an example of a hardware configuration of an RNC, according to an embodiment.

FIG. 8 is a diagram illustrating an example of a hardware configuration of an RNC, according to an embodiment. FIG. 8 illustrates a hardware configuration of the RNC 30. As depicted in FIG. 8, the RNC 30 includes, as hardware constituent elements, a base station-side IF 30a, a processor 30b, a memory 30c, an electronic circuit 30d, and a network-side IF 30e. These constituent elements are connected unidirectionally or bidirectionally in such a way as to enable input and output of signals and data.

The base station-side IF 30a is an interface device for communicating with a mobile station via a base station. The processor 30b is a device that processes data, an example of which is a CPU, a DSP, or the like. The memory 30c is a device that stores data, an example of which is RAM, ROM, or the like. An example of the electronic circuit 30d is a LSI, a FPGA, an ASIC, or the like. The network-side IF 30e is an interface device for performing wired communication with another RNC or a higher-level device such as that of a CN, by way of a wired line connected to a network of a mobile telephone system.

Furthermore, the corresponding relationships between the functional configuration and hardware configuration of the RNC 30 are as follows: the wireless communication unit 31 is realized by means of the aforementioned base station-side IF 30a and the electronic circuit 30d; the network-side communication unit 32 is realized by means of the aforementioned network-side IF 30e and the electronic circuit 30d; the call release unit 33 is realized by means of the processor 30b and the electronic circuit 30d; the call connection unit 34 is realized by means of the processor 30b and the electronic circuit 30d; and the storage unit 35 is realized by means of the aforementioned memory 30c.

Figure 9:
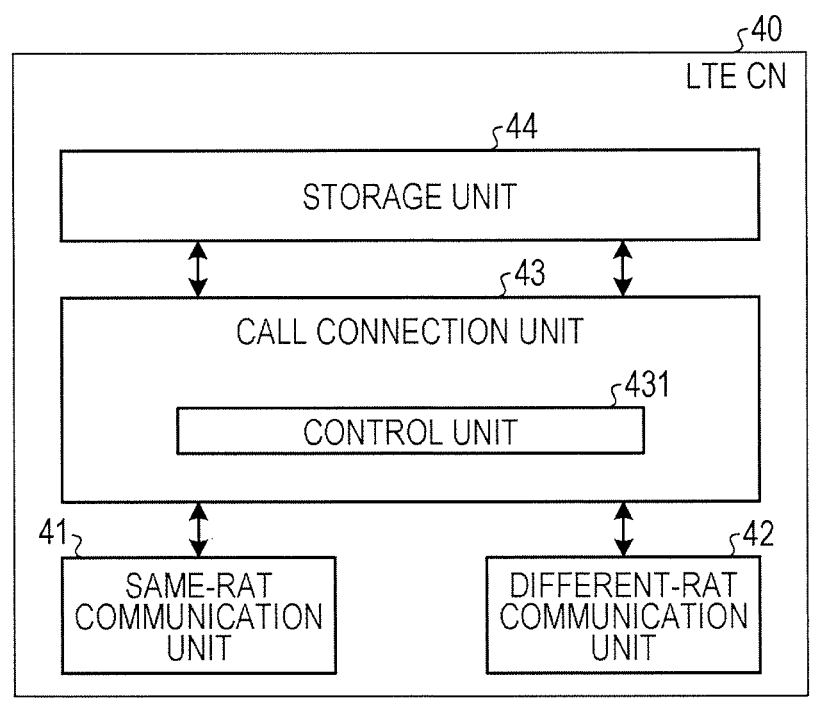
FIG. 9 is a diagram illustrating an example of a functional configuration of a Long Term Evolution (LTE) core network (CN), according to an embodiment.

FIG. 9 is a diagram illustrating an example of a functional configuration of a LTE CN, according to an embodiment. FIG. 9 illustrates a functional configuration of the LTE CN 40. As depicted in FIG. 9, the LTE CN 40 includes a same-RAT communication unit 41, a different-RAT communication unit 42, a call connection unit 43, and a storage unit 44. In addition, the call connection unit 43 includes a control unit 431. These constituent elements are connected unidirectionally or bidirectionally in such a way as to enable input and output of signals and data.

The same-RAT communication unit 41 performs wired communication with the eNB 20. The same-RAT communication unit 41 receives a "NODE HEALTH CHECK" from the eNB 20, and also transmits a "NODE HEALTH CHECK" to the eNB 20. Likewise, the different-RAT communication unit 42 performs wired communication with the WCDMA CN 50, which uses a different RAT. The different-RAT communication unit 42 receives a "NODE HEALTH CHECK" from the WCDMA CN 50, and also transmits a "NODE HEALTH CHECK" to the WCDMA CN 50.

The call connection unit 43 performs CN-side processing in the transmission and reception processing of signals between nodes. The call connection unit 43 executes processing involved in the reception of a "NODE HEALTH CHECK", or the transmission of a "NODE HEALTH CHECK", for example. The call connection unit 43 performs various control operations with respect to information stored in the storage unit 44, such as referring to (reading), changing (writing), and erasing the information.

The control unit 431 controls the reception of a "NODE HEALTH CHECK" transmitted from the eNB 20. When a "NODE HEALTH CHECK" is received from the eNB 20, the control unit 431 refers to the device status of the LTE CN 40 at that current point in time, and when the device status is set at "normal", the control unit 431 confirms whether or not an option parameter is present. The control unit 431 controls the transmission of a "NODE HEALTH CHECK" to the WCDMA CN 50. The control unit 431 causes a cycle timer to start when a service is started by the LTE CN 40, and each time a predetermined cycle T3 elapses, sets the device status at "normal", and also sets the sum of the "eNB communication count" of all eNBs stored in the storage unit 44 as a "current communication count". Furthermore, the control unit 431 sets a "maximum capacity" stored in the storage unit 44 as a "LTE maximum possible communication count", and causes a "NODE HEALTH CHECK" to be transmitted to the WCDMA CN 50.

The control unit 431 controls the reception of a "NODE HEALTH CHECK" transmitted from the WCDMA CN 50. When the "NODE HEALTH CHECK" is received from the WCDMA CN 50, the control unit 431 refers to the device status of the LTE CN 40 at that current point in time, and when the device status is set at "normal", the control unit 431 confirms whether or not an option parameter is present. The control unit 431 controls the transmission of a "NODE HEALTH CHECK" to the eNB 20.

The control unit 431 causes a cycle timer to start when a service is started by the LTE CN 40, and each time a predetermined cycle T4 elapses, sets the device status at "normal", and also performs the following processing. The control unit 431 sets the sum of the "eNB communication count" of all eNBs stored in the storage unit 44 as the "LTE communication count", and sets the "maximum capacity" as the "LTE maximum possible communication count". Furthermore, the control unit 431 sets the "maximum possible communication count" and the "current communication count" of the WCDMA CN 50 stored in the storage unit 44 as the "WCDMA maximum possible communication count" and the "WCDMA communication count", respectively, and causes a "NODE HEALTH CHECK" in which these information items have been set, to be transmitted to the eNB 20.

When the option parameter is present, the storage unit 44 stores the "eNB communication count" for each eNB. Likewise, when the option parameter is present, the storage unit 44 stores a "different-RAT maximum possible communication count" and a "different-RAT communication count" of the WCDMA CN 50. Furthermore, from the start of a service by the LTE CN 40, the storage unit 44 stores the maximum capacity of the LTE CN 40 as the "maximum capacity".

FIG. 10A is a diagram illustrating an example of a base station communication count, according to an embodiment. FIG. 10A illustrates a base station communication count 441 stored in the storage unit 44 of the LTE CN 40. The base station communication count 441 stores base station communication counts (100, 200, 800, . . . , 1500, . . . , for example) each indicating the number of times communication has been performed with a mobile station present in the area of each eNB, in association with base station numbers (1, 2, 3, . . . , 255, . . . , for example) for uniquely identifying each eNB. With regard to the default value of the base station communication count 441, the base station number is a fixed value. The default value of the base station communication count is "0", but this value may be updated. The base station communication count 441 is set when a "NODE HEALTH CHECK" transmitted from each of eNBs including the eNB 20 is received. Furthermore, reference is made to the base station communication count 441 when a "NODE HEALTH CHECK" is transmitted to the CN of a different RAT (WCDMA CN 50), and when a "NODE HEALTH CHECK" is transmitted to the eNB 20.

FIG. 10B is a diagram illustrating an example of a CN maximum capacity, according to an embodiment. FIG. 10B illustrates a CN maximum capacity 442 stored in the storage unit 44 of the LTE CN 40. The default value of the CN maximum capacity 442 is the maximum possible number of times communication is able to be performed by means of the LTE RAT. Furthermore, in the case of the WCDMA CN 50, the maximum possible number of times communication is able to be performed by means of WCDMA is stored in an updatable manner, as the default value of the CN maximum capacity 442. Furthermore, reference is made to the CN maximum capacity 442 when a "NODE HEALTH CHECK" is transmitted to the CN of a different RAT (WCDMA CN 50), and when a "NODE HEALTH CHECK" is transmitted to the eNB 20.

FIG. 10C is a diagram illustrating an example of a different-RAT communication state, according to an embodiment. FIG. 10C illustrates a different-RAT communication state 443 stored in the storage unit 44 of the LTE CN 40. As depicted in FIG. 10C, the different-RAT communication state 443 includes the different-RAT maximum possible communication count and the different-RAT communication count. The different-RAT maximum possible communication count is the maximum value for the number of times communication is permitted by a RAT (WCDMA) different from LTE, and the different-RAT communication count is the number of times (actual value) communication has actually been performed using a RAT (WCDMA) different from LTE. The default value for the values stored in the areas making up the different-RAT communication state 443 is "0". The different-RAT communication state 443 is set when a "NODE HEALTH CHECK" transmitted from a CN of a different RAT (WCDMA CN 50) is received. Furthermore, reference is made to the different-RAT communication state 443 when a "NODE HEALTH CHECK" is transmitted to the eNB 20.

Figure 11:
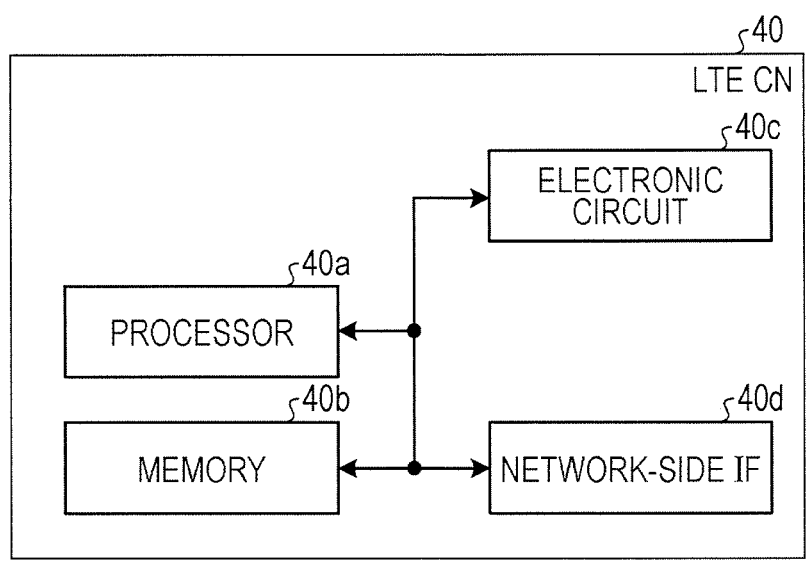
FIG. 11 is a diagram illustrating an example of a hardware configuration of a LTE CN, according to an embodiment.

FIG. 11 is a diagram illustrating an example of a hardware configuration of a LTE CN, according to an embodiment. FIG. 11 illustrates a hardware configuration of the LTE CN 40. As depicted in FIG. 11, the LTE CN 40 includes, as hardware constituent elements, a processor 40a, a memory 40b, an electronic circuit 40c, and a network-side IF 40d. These constituent elements are connected unidirectionally or bidirectionally in such a way as to enable input and output of signals and data.

The processor 40a is a device that processes data, an example of which is a CPU, a DSP, or the like. The memory 40b is a device that stores data, an example of which is RAM, ROM, or the like. An example of the electronic circuit 40c is a LSI, a FPGA, an ASIC, or the like. The network-side IF 40d is an interface device for performing wired communication with another eNB or a higher-level device such as that of a CN, by way of a wired line connected to a network of a mobile telephone system.

Furthermore, the corresponding relationships between the functional configuration and hardware configuration of the LTE CN 40 are as follows: the same-RAT communication unit 41 is realized by means of the aforementioned electronic circuit 40c and the network-side IF 40d; the different-RAT communication unit 42 is realized by means of the aforementioned electronic circuit 40c and the network-side IF 40d; the call connection unit 43 is realized by means of the aforementioned processor 40a and the electronic circuit 40c; and the storage unit 44 is realized by means of the aforementioned memory 40b.

The configuration of the LTE CN 40 has been representatively described above, and the configuration of the WCDMA CN 50 is the same as the configuration of the LTE CN 40 except for the control unit. Accordingly, reference numerals having the same endings are appended to common constituent elements, and also depictions and detailed descriptions thereof have been omitted. To be specific, a same-RAT communication unit 51, a different-RAT communication unit 52, a call connection unit 53, and a storage unit 54 of the WCDMA CN 50 are constituent elements respectively corresponding to the same-RAT communication unit 41, the different-RAT communication unit 42, the call connection unit 43, and the storage unit 44 of the LTE CN 40. Furthermore, a processor 50a, a memory 50b, an electronic circuit 50c, and a network-side IF 50d of the WCDMA CN 50 are constituent elements respectively corresponding to the processor 40a, the memory 40b, the electronic circuit 40c, and the network-side IF 40d of the LTE CN 40.

A control unit 531 of the call connection unit 53 causes a cycle timer to start when a service is started by the WCDMA CN 50, and each time a predetermined cycle T5 elapses, sets the device status of the WCDMA CN 50 at "normal", and also performs the following processing. The control unit 531 sets the sum of the "RNC communication count" of all RNCs stored in the storage unit 54 as a "WCDMA communication count", and sets the "maximum capacity" as the "WCDMA maximum possible communication count". Furthermore, the control unit 531 sets the "maximum possible communication count" and the "current communication count" of the LTE CN 40 stored in the storage unit 54 as the "LTE maximum possible communication count" and the "LTE communication count", respectively, and causes a "NODE HEALTH CHECK" in which these information items have been set, to be transmitted to the RNC 30.

Figure 12:
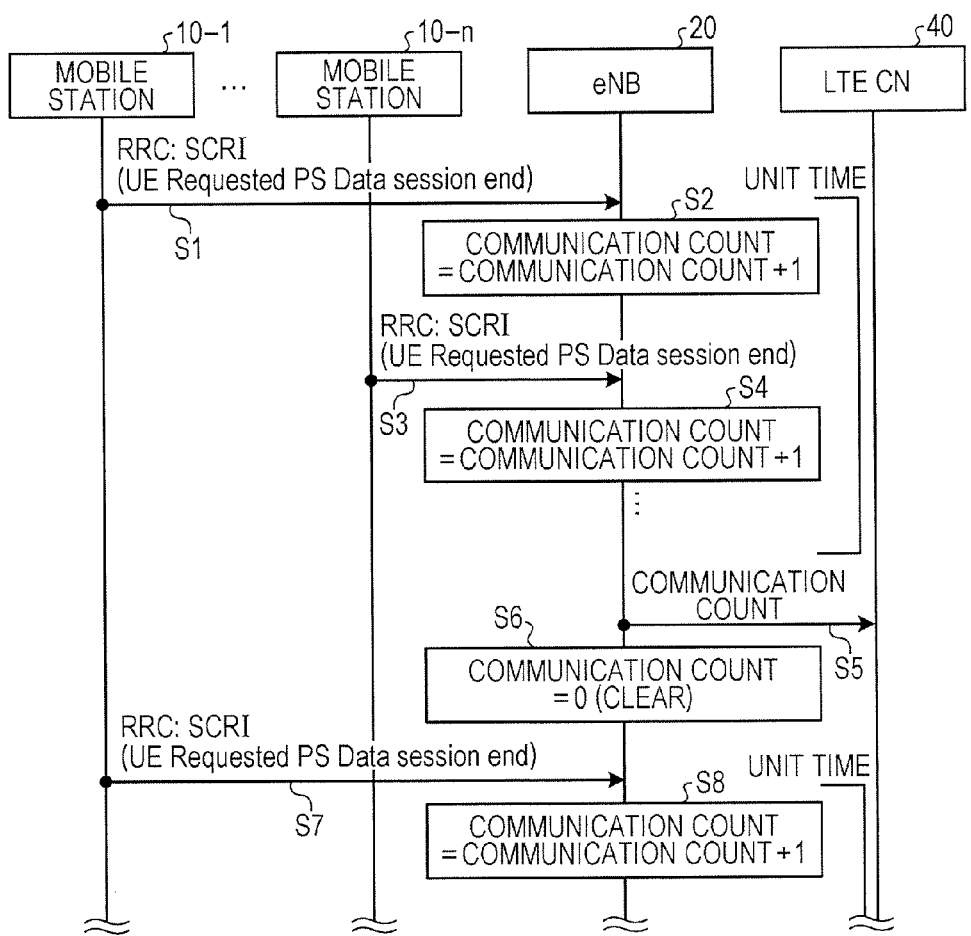
FIG. 12 is a diagram illustrating an example of an operational sequence for communication count totaling processing, according to an embodiment.

Next, the operation of the wireless communication system 1 in the embodiment is described. FIG. 12 is a diagram illustrating an example of an operational sequence for communication count totaling processing, according to an embodiment. FIG. 12 illustrates communication count totaling processing that is executed by the eNB 20. In the following operation description, n (n being a natural number) number of mobile stations having the same configuration as the mobile station 10 are referred to as mobile stations 10-1 to 10-n. Furthermore, the operations of the eNB 20 as a base station and the LTE CN 40 as a CN are representatively described for convenience of the description; however the same operations may be performed by the RNC 30 and the WCDMA CN 50, respectively.

In S1, the wireless communication unit 11 of the mobile station 10-1 transmits a SCRI to the eNB 20. The SCRI is a RRC transmission function supported in the Fast Dormancy (cut-off procedure in automatic communication) function stipulated in 3GPP Rel. 8.

In S2, the determination unit 231 of the eNB 20 counts the number of times communication is performed with the mobile station 10-1. The same processing of S1 and S2 is executed also for another mobile station 10-n (S3, S4). In other words, the eNB 20 counts the number of times the SCRI is received from all the mobile stations present in the cell of the eNB 20, and causes the reception count per unit time to be stored in the storage unit 25. The unit time is from a few seconds to ten-odd seconds, and is approximately four seconds, for example.

In S5, the network-side communication unit 22 of the eNB 20 notifies the reception count per unit time to the LTE CN 40 to which the eNB 20 belongs. When the same-RAT communication unit 41 of the LTE CN 40 receives this notification, the same-RAT communication unit 41 causes the reception count per unit time to be stored in the storage unit 44. The communication count is repeatedly counted each time the unit time elapses. In other words, in S6, the determination unit 231 of the eNB 20 again executes the processing of the aforementioned S1 to S5 after the communication count calculated in S4 has been cleared to "0" (S7, S8).

FIG. 13 is a diagram illustrating an example of an operational sequence for communication count totaling processing, according to an embodiment. FIG. 13 illustrates communication count totaling processing that is executed by the LTE CN 40 and the WCDMA CN 50. In S11, the network-side communication unit 32 of a RNC 30-1 notifies the WCDMA CN 50 of the number of times communication has been performed with all the mobile stations present in the area of the RNC 30-1. The WCDMA CN 50 stores, in the storage unit 54, the communication count notified in S11 (S12). The processing performed in S11 and S12 is likewise executed also for other RNCs 30-2 to 30-n (S13, S14). When the unit time elapses, the control unit 531 of the WCDMA CN 50 totals the communication counts for all the RNC 30-1 to 30-n that have been notified and stored, and causes the total value to be stored in the storage unit 54. The processing of S11 to S15 is likewise executed also between each eNB 20-1 to 20-n and the LTE CN 40 (S16 to S20).

Although messages for notifying the communication count totaling result between different RATs are not stipulated in 3GPP, HEALTH CHECK signals are transmitted and received among base stations and CNs and among CNs themselves in order to confirm the normality of control links. Consequently, in the wireless communication system 1 in the embodiment, the base stations and the CNs add the communication count totaling result to NODE HEALTH CHECK signals to thereby notify the communication count.

FIG. 14 is a diagram illustrating an example of a node health check signal, according to an embodiment. FIG. 14 illustrates an exemplary configuration of a "NODE HEALTH CHECK" signal M1 transmitted to the CNs 40 and 50 from the eNB 20 and the RNC 30. As depicted in FIG. 14, the "NODE HEALTH CHECK" signal M1 includes an "IE/Group Name" area where the type of the information transmitted and received is retained, and a "Presence" area where the status assumed by the corresponding information at the current point in time is retained. In the "Presence" area, "M" for example is retained as a "Message Type", and "M" for example is retained as a "Message ID". In addition, "M" for example is retained as the current "device status" of the transmission source (the eNB 20 or the RNC 30), and an initial value "0" for example is retained as the "base station communication count".

Referring back to FIG. 13, in S21, the different-RAT communication unit 52 of the WCDMA CN 50 transmits, to the LTE CN 40, the communication count stored in S15 and the maximum possible number of times communication is able to be performed by WCDMA. Likewise, the different-RAT communication unit 42 of the LTE CN 40 transmits, to the WCDMA CN 50, the communication count stored in S20 and the maximum possible number of times communication is able to be performed by LTE (S22). When the exchange of the communication counts and the maximum possible communication counts of the RATs is completed between the WCDMA CN 50 and the LTE CN 40, these count values are stored in the storage units 54 and 44 in a form such that the count values may be referred to by the control units 531 and 431 of the CNs (S23, S24).

FIG. 15 is a diagram illustrating an example of a node health check signal, according to an embodiment. FIG. 15 illustrates an exemplary configuration of a "NODE HEALTH CHECK" signal M2 transmitted and received between the LTE CN 40 and the WCDMA CN 50. As depicted in FIG. 15, the "NODE HEALTH CHECK" signal M2 includes an "IE/Group Name" area where the type of the information transmitted and received is retained, and a "Presence" area where the status assumed by the corresponding information at the current point in time is retained. In the "Presence" area, "M" for example is retained as a "Message Type", and "M" for example is retained as a "Message ID". In addition, "M" for example is retained as the current "device status" of the transmission source (the LTE CN 40 or the WCDMA CN 50), and an initial value "0" for example is retained for each of the "maximum possible communication count" and the "current communication count".

Referring back to FIG. 13, in S25 to S30, the communication counts and the maximum possible communication counts of each RAT are notified to every RNC 30-1 to 30-$n$ connected to the WCDMA CN 50. It is therefore possible, in the RNCs 30-1 to 30-$n$, to determine which RAT from among WCDMA and LTE has a low load. The same processing is executed also at the LTE side. In S31 to S36, the communication counts and the maximum possible communication counts of each RAT are notified to the eNBs 20-1 to 20-$n$, and it is therefore possible for every eNB connected to the LTE CN 40 to determine the RAT having a low load as the standby RAT of a mobile station.

FIG. 16 is a diagram illustrating an example of a node health check signal, according to an embodiment. FIG. 16 illustrates an exemplary configuration of a "NODE HEALTH CHECK" signal M3 transmitted to the eNB 20 and the RNC 30 from the CNs 40 and 50. As depicted in FIG. 16, the "NODE HEALTH CHECK" signal M3 includes an "IE/Group Name" area where the type of the information transmitted and received is retained, and a "Presence" area where the status assumed by the corresponding information at the current point in time is retained. In the "Presence" area, "M" for example is retained as a "Message Type", and "M" for example is retained as a "Message ID". Furthermore, "M" for example is retained as the current "device status" of the transmission source (the LTE CN 40 or the WCDMA CN 50). In addition, an initial value "0" for example is retained for each of the "WCDMA maximum possible communication count", the "WCDMA communication count", the "LTE maximum possible communication count", and the "LTE communication count".

Referring back to FIG. 13, when the next unit time starts, the aforementioned series of processing from S11 to S36 is executed again (S37 to S40, for example). The same processing is repeatedly executed at each unit time.

Figure 17:
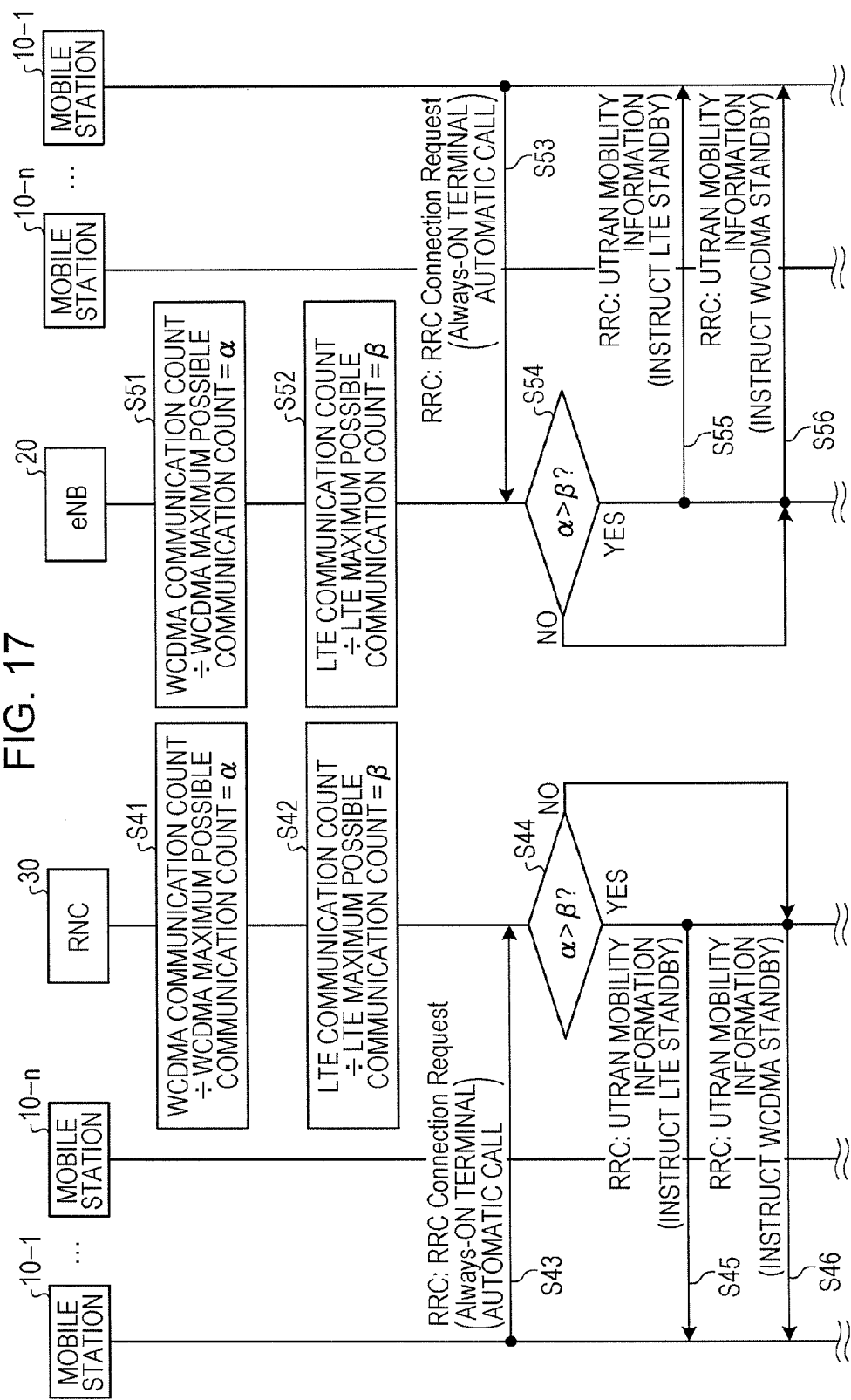
FIG. 17 is a diagram illustrating an example of an operational sequence for standby RAT determination processing, according to an embodiment.

FIG. 17 is a diagram illustrating an example of an operational sequence for standby RAT determination processing, according to an embodiment. FIG. 17 illustrates standby RAT determination processing that is executed by an eNB and a RNC. In S41, the control unit 342 of the RNC 30 calculates $\alpha$ from the WCDMA communication count (total RNC communication count) and the WCDMA maximum possible communication count received from the WCDMA CN 50 in S25 and S26 depicted in FIG. 13. The value $\alpha$ is a value obtained by dividing the WCDMA communication count by the WCDMA maximum possible communication count, and is an indicator of the communication load caused by automatic calls at the WCDMA side. In S42, the same processing as S41 is executed with respect to LTE. In other words, the control unit 342 of the RNC 30 calculates $\beta$ from the LTE communication count (total eNB communication count) and the LTE maximum possible communication count received from the WCDMA CN 50 in S25 and S26 depicted in FIG. 13. The value $\beta$ is obtained by dividing the LTE communication count by the LTE maximum possible communication count, and is an indicator of the communication load caused by automatic calls at the LTE side.

The wireless communication unit 31 of the RNC 30 waits for reception of RRC from the mobile stations 10-1 to 10-$n$, and, for example, receives a RRC Connection Request that is transmitted together with a new automatic call from the mobile station 10-1 (S43). When the control unit 342 detects the reception of the RRC Connection Request, the control unit 342 compares $\alpha$ and $\beta$ (S44). When the result of the comparison is $\alpha > \beta$ (Yes in S44), the control unit 342 determines that the load of the different RAT (LET) is lower than the RAT (WCDMA) thereof. Accordingly, on the basis of this determination result, the wireless communication unit 31 of the RNC 30 returns, to the mobile station 10-1, RRC (UTRAN MOBILITY INFORMATION) instructing standby in the different RAT (LTE) having a low load (S45). In contrast to this, when the result of the comparison in S44 is $\alpha \leq \beta$ (No in S44), the control unit 342 determines that the load of the RAT (WCDMA) thereof is lower than that of the different RAT (LET). Accordingly, on the basis of this determination result, the wireless communication unit 31 of the RNC 30 returns, to the mobile station 10-1, RRC (UTRAN MOBILITY INFORMATION) instructing standby in the RAT (WCDMA) thereof having a low load (S46).

Although the above description relates to standby RAT determination processing at the WCDMA side, the aforementioned series of processing is likewise executed also at the LTE side. The operation of the LTE-side eNB 20 is the same as the operation of the WCDMA-side RNC 30. Furthermore, the operations of the LTE-side mobile stations 10-1 to 10-$n$ are the same as the operations of the WCDMA-side mobile stations 10-1 to 10-$n$. Accordingly, reference numerals having the same endings are appended to common steps, and also detailed descriptions thereof are omitted here. To be specific, the processing indicated in steps S51 to S56 correspond to the processing of the aforementioned steps S41 to S46, respectively.

Furthermore, the calculations of α and β or the determination of the standby RAT do not necessarily have to be performed at both base stations (the RNC 30 and the eNB 20), and the calculation results or the determination results of any one base station may be shared with the other base station. In this mode, the RNC 30 notifies the values of α and β calculated in S41 and S42, to the eNB 20 via a higher-level device of the WCDMA CN 50 or the HSS 60, for example. Alternatively, the RNC 30 notifies the standby RAT determined in S44, to the eNB 20 via a higher-level device. The system load due to standby RAT determination processing is therefore reduced. Furthermore, it becomes possible to reduce memory usage.

Figure 18:
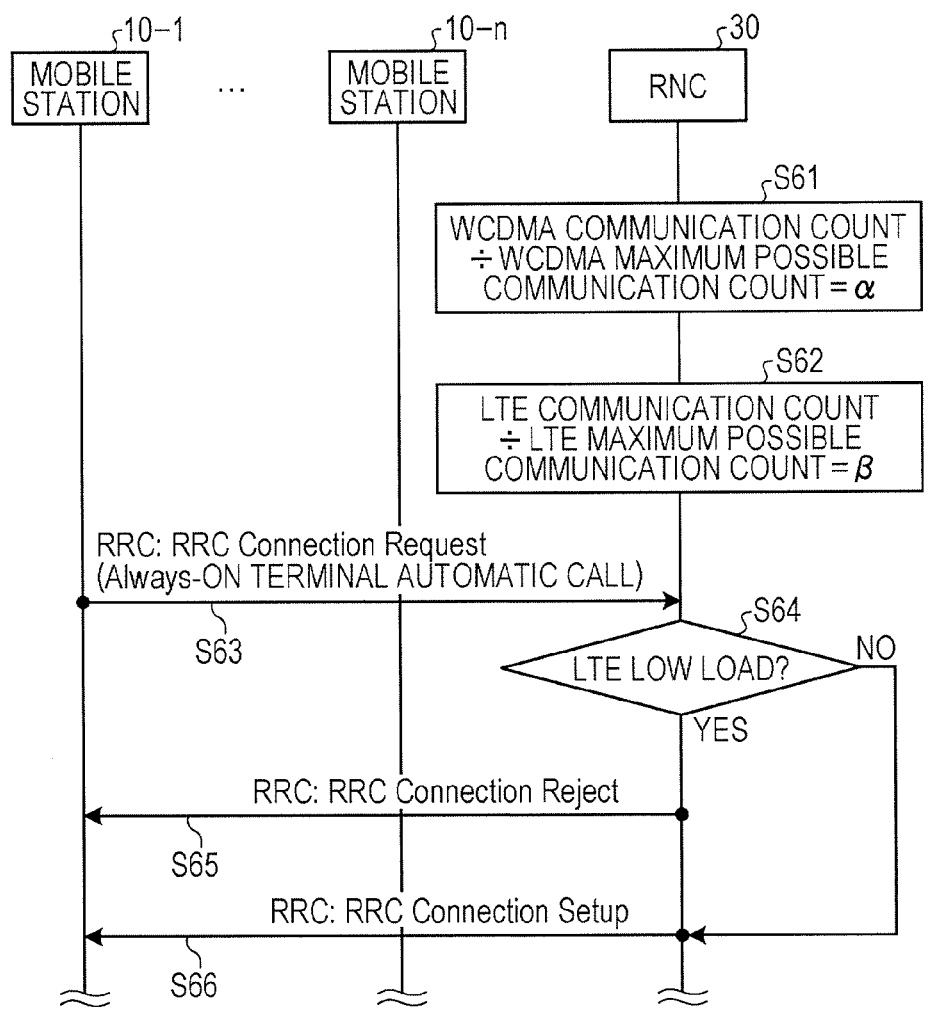
FIG. 18 is a diagram illustrating an example of an operational sequence for RAT switching suppression processing, according to an embodiment.

FIG. 18 is a diagram illustrating an example of an operational sequence for RAT switching suppression processing, according to an embodiment. FIG. 18 illustrates RAT switching suppression processing that is executed by the RNC 30 when the WCDMA side has a low load. FIG. 18 includes a plurality of the same steps as FIG. 17, and reference numerals having the same endings are therefore appended to common steps, and also detailed descriptions thereof are omitted here. To be specific, the processing indicated in steps S61 to S63 in FIG. 18 respectively correspond to the steps S41 to S43 depicted in FIG. 17. The differences with FIG. 17 are described hereafter.

In S64, when the control unit 342 of the RNC 30, for example, detects reception of a RRC Connection Request transmitted from the mobile station 10-1, the control unit 342 compares the α and β values, and determines whether or not the LTE load is lower than the WCDMA load, on the basis of the comparison result. During this process, the control unit 342 determines that the LTE side has a low load when α>β, and determines that the WCDMA side has a low load when α≤β. When it is determined that the LTE side has a low load (Yes in S64), the wireless communication unit 31 of the RNC 30 returns RRC Connection Reject as RRC, to the mobile station 10-1. Therefore, the RNC 30 causes the RAT to be switched from WCDMA to LTE, and suppresses the mobile station 10-1 from selecting WCDMA as the standby RAT. As a result, it is possible for the mobile station 10-1 to perform a standby process in LTE that has a higher speed and a lower load. On the other hand, when as a result of the determination in S64 it is determined that the LTE side does not have a low load (No in S64), the wireless communication unit 31 of the RNC 30 returns RRC Connection Setup as RRC, to the mobile station 10-1 (S66). Therefore, because the RAT switching control (redirection) performed by the RNC 30 is suppressed, the mobile station 10-1 continues to use WCDMA as the standby RAT. As a result, even when a LTE-side base station or CN is congested, further increase in congestion caused by RAT switching is avoided.

In addition, although the mobile station 10-1 transmits a "RRC Connection Request" to a base station (the RNC 30 or the eNB 20) by means of the wireless communication unit 11 in S43, S53, and S63, a "Cause" for specifying an automatic call by an always-on terminal is not stipulated in 3GPP. Consequently, in the embodiment, a new "Cause" is added in the "RRC Connection Request".

FIG. 19 is a diagram illustrating an example of information indicating a cause specifying an automatic call, according to an embodiment. FIG. 19 illustrates a "Cause" for specifying an automatic call in a "RRC Connection Request". In the wireless communication system 1 according to the embodiment, when a transmission from a mobile station 10 operating as an always-on terminal is an automatic call, the mobile station 10 sets a new Cause C1 ("spare9", for example) in the "RRC Connection Request", as depicted in FIG. 19. The base station that has received the "RRC Connection Request" recognizes that the transmission from the mobile station 10 is an automatic call when the new Cause C1 has been set as an identifier. Therefore, the base station (the RNC 30 or the eNB 20) may easily and promptly identify whether the transmission of the "RRC Connection Request" by the mobile station 10 is a user call such as a voice call or a packet call, or is an automatic call.

Next, the operation of the mobile station 10 is described. FIG. 20 is a diagram illustrating an example of an operational flowchart for a mobile station, according to an embodiment. FIG. 20 illustrates the operation of the mobile station 10 when a call is issued. First, in S71, the call connection unit 13 of the mobile station 10 waits for a call request from a user with respect to the mobile station 10, and when a call request is detected, the call connection unit 13 determines whether or not the call request has been issued by means of a manual operation of the user. When the result of the determination is that the call request is a manual call (Yes in S71), the call connection unit 13 sets the value "present" indicating that there is a user call, to the user call presence indicator 121 (see FIG. 3) in the storage unit 12 (S72). On the other hand, when the result of the determination is that the call request is not a manual call (user call) (No in S71), the processing of step S72 is skipped, and the operation moves to the processing of the following step S73.

In S73, the call connection unit 13 of the mobile station 10 refers to the current set value of the user call presence indicator 121. when the reference result is that the user call presence indicator 121 is set at "absent" (Yes in S73), the call connection unit 13 sets a "new Cause C1" (see FIG. 19) indicating that the call request is an automatic call, to an "Establishment Cause" forming part of the "RRC Connection Request" to the eNB 20 (S74). On the other hand, when the reference result is that the user call presence indicator 121 is set at "present" (No in S73), the call connection unit 13 sets a regular "Establishment Cause" in the "RRC Connection Request", without adding the "new Cause C1" to the "Establishment Cause" (S75).

Once the generation of the "RRC Connection Request" has been completed, the wireless communication unit 11 of the mobile station 10 transmits the "RRC Connection Request" to the eNB 20 (S76). Furthermore, the aforementioned series of call control processing is executed not only when there is a call to the eNB 20 but also when there is a call to the RNC 30.

Next, FIG. 21 is a diagram illustrating an example of an operational sequence for a mobile station, according to an embodiment. FIG. 21 illustrates the operation of the mobile station 10 when the RAT is changed. When the standby RAT is changed, the mobile station 10 transmits and receives signals with a UTRAN (Universal mobile telecommunications system Terrestrial Radio Access Network) 70, in accordance with 3GPP 25.331 Figure 8.3.3-1. In other words, when the wireless communication unit 11 of the mobile station 10 transmits "UTRAN MOBILITY INFORMATION" to the UTRAN 70 (S81), the UTRAN 70 returns a "UTRAN MOBILITY INFORMATION Confirm" as a confirmation response signal (S82).

FIG. 22 is a diagram illustrating an example of an operational sequence for a mobile station, according to an embodiment. FIG. 22 illustrates the operation of the mobile station 10 when a call is released. When, during packet transmission with the eNB 20 (S91), the call release unit 14 of the mobile station 10 detects that packets have not been transmitted for a predetermined time period (S92), the call release unit 14 sets "UE Requested PS Data session end" in a "Signaling Connection Release Indication Cause" of RRC (S93). Once the editing of the "Signaling Connection Release Indication" has been completed, the wireless communication unit 11 of the mobile station 10 transmits the "Signaling Connection Release Indication" to the eNB 20 (S94). After the transmission has been completed, the call release unit 14 updates the user call presence indicator 121 (see FIG. 3) in the storage unit 12, to the value "absent" indicating that a user call is not present (S95). Furthermore, the aforementioned series of call release control processing is executed not only when a call to the eNB 20 is released but also when a call to the RNC 30 is released.

FIG. 23 is a diagram illustrating an example of a manner in which a wireless switching function and change of a standby RAT are performed, according to an embodiment. FIG. 23 illustrates whether or not a wireless switching function and standby RAT change are performed, in accordance with the communication start RAT and load status of the mobile station 10. As depicted in FIG. 23, whether or not a wireless switching function and standby RAT change are performed is determined based on parameters of the RAT (communication start RAT) used when the mobile station 10 started communication, the call method, the call type, and the load status. For example, as indicated by the data in the uppermost entry in FIG. 23, it is assumed that the "communication start RAT" is "WCDMA", the "call method" is "automatic call", the "call type" is "packet", and the "load status" is "WCDMA<LTE". In this case, conventionally, "WCDMA" which is the communication start RAT is switched to "LTE" by a "wireless switching function" according to 3GPP standards, and as a result of this the standby RAT is changed to "LTE". Consequently, the mobile station performs standby in "LTE". In contrast to this, in the present embodiment, in the aforementioned case the mobile station 10 does not have a "wireless switching function" (see D1 in FIG. 23). Therefore, the mobile station 10 takes into account the "load status" and suppresses change of the standby RAT from "WCDMA" to "LTE", and continues standby in "WCDMA" as when communication was started.

Meanwhile, when the "load status" is "WCDMA LTE", the mobile station 10 has a "wireless switching function". Accordingly, even if the "communication start RAT" of the mobile station 10 is "WCDMA", the communication start RAT is switched to "LTE" which is faster, by means of the wireless switching function. Due to this, the standby RAT is changed to "LTE" from "WCDMA" as depicted by D2 and D3 in FIG. 23. As a result, the mobile station 10 thereafter performs standby in "LTE". Contrastingly, when the "load status" is "WCDMA LTE", the mobile station 10 does not have a "wireless switching function" as per 3GPP standards. However, when the "communication start RAT" of the mobile station 10 is "LTE", the communication start RAT (LTE) is switched to "WCDMA" which has a lower load. Due to this, the standby RAT is changed to "WCDMA" from "LTE" (see D4 and D5 in FIG. 23). As a result, the mobile station thereafter performs standby in "WCDMA".

As described above, the wireless communication system 1 includes the mobile station 10 which is able to communicate by means of LTE and WCDMA, and includes the eNB 20 which communicates with the mobile station 10. The eNB 20 includes the control unit 242 and the wireless communication unit 21. The control unit 242 estimates the communication load (the α and β values, for example) of LTE and WCDMA on the basis of the number of times (actual value) communication is performed by automatic calls from the mobile station 10 and the maximum possible number of times (upper limit value) communication is able to be performed by the automatic calls. The wireless communication unit 21 notifies, to the mobile station 10, the RAT (LTE, for example) having the lower communication load estimated by the control unit 242, from among LTE and WCDMA. The mobile station 10 includes the call connection unit 13 which uses the RAT notified by the wireless communication unit 21 for standby involved in the automatic calls.

In other words, the eNB 20 and the RNC 30 monitor all automatic call counts by always-on terminals with respect to each RAT, and determine the RAT having a low automatic call rate (low load) as the standby RAT. When the eNB 20 and the RNC 30 notify an always-on terminal of the determined RAT, the terminal performs standby in the notified RAT. Therefore, a concentration in standby being performed in a specific RAT is avoided, and a loss of calls due to congestion and a further increase in congestion are suppressed.

The wireless communication system 1 according to the embodiment demonstrates the following effects, for example. The wireless communication system 1 determines the standby RAT of a mobile station 10 which has newly issued an automatic call, as the RAT having a low load. Accordingly, it is possible to avoid the situation in which, in the past, a call request received at the WCDMA side and for which communication is to be continued at the WCDMA side has been lost or become subject to restriction due to automatic calls from a mobile station (an always-on terminal capable of voice communication, for example) other than the mobile station 10. In addition, in the wireless communication system 1, when it is determined that the load of the LTE side is high compared to the load of the WCDMA side, the load status of the LTE side is taken into account, and RAT switching (redirection) for the mobile station 10 that has issued an automatic call at the WCDMA side is suppressed. Therefore, RAT switching is no longer performed when the LTE side is congested, and a further increase in congestion is avoided.

Upon detection of the automatic call, the wireless communication unit 21 in the eNB 20 may instruct the mobile station 10 that issued the automatic call in question to perform standby by means of the RAT (WCDMA, for example) having a low communication load estimated by the control unit 242. Therefore, the eNB 20 is able to cause the mobile station 10 that has issued the automatic call to the eNB 20 to perform standby in the RAT having the lower load. Accordingly, load is distributed between RATs without a large number of mobile stations including the mobile station 10 using the same one RAT for standby. As a result, the wireless communication system 1 is able to efficiently process automatic calls.

The control unit 242 in the eNB 20 may use the results of totaling the communication count (actual value) and the maximum possible communication count (upper limit value) for each predetermined time period (approximately four seconds, for example) to estimate the communication load (the α and β values, for example) for each of the predetermined time periods. Therefore, the mobile station 10 is able to ordinarily perform standby in the RAT having a low load even when the connection states of the RATs are changed. Accordingly, the wireless communication system 1 is able to easily cope with changes in the load state caused by changes that occur over time in the communication environment, and so on. As a result, the environmental adaptability of the wireless communication system 1 is improved.

As mentioned above, in the wireless communication system 1 in the embodiment, by applying technology for distributing load between RATs to processing automatic calls from always-on terminals, a characteristic effect is demonstrated in the embodiment that is different from that of conventional load distribution technology. For example, when the mobile station 10 that operates as an always-on terminal uses the RAT having a low load in order to reduce communication load when issuing a voice or packet user call, WCDMA is selected as the standby RAT when the WCDMA load is lower than the LTE load. As a result, the mobile station 10 is not able to perform standby by means of LTE, which has a higher speed than WCDMA, and there is a possibility that this may be detrimental for user convenience. Consequently, the wireless communication system 1 applies technology for distributing load between RATs, to automatic call processing which does not involve the user. Therefore, the user is able to benefit from a function that, as an always-on function, automatically updates applications in the terminal, without there being a detrimental effect on user convenience. In addition, there is concern that automatic calls from always-on terminals cause a dramatic increase in the communication traffic of a mobile network; however, with the wireless communication system 1 according to the embodiment, automatic calls are appropriately distributed among a plurality of RATs. As a result, it is possible to suppress communication load.

In addition, the eNB 20 and the RNC 30 in this embodiment use the number of times communication is performed by automatic calls (hereafter denoted as the "automatic call count") when estimating the communication load of each RAT on the basis of the ratio of the number of times communication is performed with respect to the maximum number of times communication is able to be performed. However, the eNB 20 and the RNC 30 are not restricted to using the automatic call count, and may use the user call count. In this case, the α value is the value obtained by dividing the number of times user calls are issued by means of WCDMA by the maximum value for the number of times user calls are able to be issued by means of WCDMA, and the β value is the value obtained by dividing the number of times user calls are issued by means of LTE by the maximum value for the number of times user calls are able to be issued by means of LTE. In addition, when selecting the standby RAT, the eNB 20 and the RNC 30 may estimate the communication load by using, from within the user call count, the voice call count in particular, or the packet call count.

Furthermore, in the wireless communication system 1 in this embodiment, the magnitudes of the α and β values are simply compared and the RAT corresponding to the smallest value from among α and β is set as the standby RAT. However, a weighting may be applied prior to the comparison, without restriction to the aforementioned mode. In other words, it is possible to adopt a mode in which the eNB 20 and the RNC 30 multiply either calculation result from among α and β by a predetermined coefficient, and either of the RATs is thereby preferentially selected as the standby RAT. For example, when the eNB 20 and the RNC 30 multiply β by a coefficient that is less than 1 (0.8, for example) prior to the comparison of α and β, the possibility of α>β increases. Therefore, the eNB 20 and the RNC 30 are able to preferentially designate "LTE" as the standby RAT for the mobile station 10. Accordingly, when there is some allowance with respect to the LTE communication capacity compared to that of WCDMA, it is preferable for weighting such as that mentioned above to be performed. Contrastingly, when the WCDMA-permitted communication capacity is greater, the probability of WCDMA being selected increases when the eNB 20 and the RNC 30 multiply β by a coefficient that exceeds one (1.2, for example). In this way, by variably setting the coefficient, the eNB 20 and the RNC 30 are able to adjust the load in accordance with the communication capacities of the RATs.

In addition, in this embodiment, the wireless communication system 1 estimates that the RAT having a low value from among the α and β values is the RAT having a low load; however, the difference between the α and β values may also be employed as a reference for estimating load. In other words, the eNB 20 and the RNC 30 retain the α and β values of the previous unit time in the storage unit 25 and the storage unit 35, respectively, and calculate "α'−α" and "β'−β", which constitute the differences with α' and β' in the current time period. The eNB 20 and the RNC 30 then estimate that the RAT having the smaller difference is the RAT having a low load from the fact that the degree of increase in the automatic call count is small (or the degree of decrease is large).

Alternatively, the eNB 20 and the RNC 30 may use the rate of increase of the α and β values ("α'/α" and "β'/β") instead of the differences to estimate the load of each RAT. In this mode, the eNB 20 and the RNC 30 estimate that the RAT having the lower rate of increase (or the higher rate of decrease) is the RAT having a low load. In both of the aforementioned modes that use either the difference or the rate of increase, the communication load may be estimated with greater accuracy by taking into account the changes that occur over time within the time units. Furthermore, in the wireless communication system 1, the method for estimating the low-load RAT by using either the difference or the rate of increase and the method for applying a weighting may be combined.

In addition, the eNB 20 and the RNC 30 in this embodiment select a standby RAT from among the two types of RAT of LTE and WCDMA. However, the eNB 20 and the RNC 30 may select a RAT having a low load from among three or more RATs (LTE, WCDMA, and CDMA2000, for example). More than one RAT may be selected during this process. Furthermore, with respect to the RATs from which selection is to be made, as with LTE and WCDMA, RATs using different frequency bands do not necessarily have to be used, and RATs using the same frequency band may be applied in the wireless communication system 1 according to the embodiment, as long as the wireless communications schemes are different.

Furthermore, in this embodiment, a description has been given in which a mobile telephone, a smart phone, or a personal digital assistant (PDA) is envisaged as the mobile station; however, the present embodiment is not restricted to a mobile station, and may be applied to a variety of communication devices that issue automatic calls either directly or indirectly with respect to an eNB or a RNC.

In addition, the constituent elements of the wireless communication system 1 do not necessarily have to be physically configured as depicted. In other words, the specific manner in which the devices are distributed or integrated is not restricted to that depicted in the drawings, and the entirety or a portion thereof may be configured by being functionally or physically distributed or integrated in arbitrary units in accordance with various loads and the usage state and so on. For example, the call connection unit 13 and the call release unit 14 depicted in FIG. 2, or the call release unit 23 and the call connection unit 24 depicted in FIG. 5, may be integrated as a single constituent element. During this process, the call connection units 13 and 24 may be configured to include the call release units 14 and 23, respectively, as single constituent elements. Furthermore, in contrast to this, the call connection units 24 and 34 of the eNB 20 and the RNC 30 may be each distributed into a section that calculates the ratio of the number of times communication is performed with respect to the maximum number of times communication is able to be performed, and a section that estimates the RAT having a low communication load, for example. Furthermore, the memories $10c$, $20c$, $30c$, $40b$, and $50b$ may be configured as external devices of the mobile station 10, the eNB 20, the RNC 30, the LTE CN 40, and the WCDMA CN 50 that connect via a network or a cable.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A base station configured to communicate with a mobile station capable of supporting first and second wireless communication schemes, the base station comprising:
    a memory configured to store a communication count and a maximum communication count for either the first wireless communication scheme or the second wireless communication scheme, the communication count being configured to indicate a number of communications that have been performed by an automatic call from the mobile station, the automatic call being different from a user call from the mobile station, and the maximum communication count being configured to indicate a maximum number of possible communications that are performed by the automatic call; and
    a processor configured to:
    estimate communication loads of the first and second wireless communication schemes, based on the communication count and the maximum communication count, and
    notify the mobile station of a priority communication scheme selected between the first and second wireless communication schemes, based on the estimated communication loads of the first and second wireless communication schemes, the priority communication scheme having a lower communication load between the first and second wireless communication schemes.

2. The base station of claim 1, wherein the processor is further configured to, upon detection of a second automatic call from the mobile station, instruct the mobile station to enter a standby state in which the priority communication scheme is to be used for communication with the base station.

3. The base station of claim 1, wherein the processor is further configured to estimate a communication load for each of a predetermined time period based on a result of totaling communication counts and maximum communication counts received from other base stations.

4. The base station of claim 1, wherein the automatic call comprises an autonomous call from the mobile station for updating one or more application programs on the mobile station.

5. The base station of claim 1, wherein the user call comprises a voice call or a packet call by a user of the mobile station.

6. The base station of claim 1, wherein:
    the communication count comprises a value representing a number of communications that have been actually performed by the automatic call from the mobile station using one of the first wireless communication scheme and the second wireless communication scheme; and
    the maximum communication count comprises a value representing a maximum number of possible communications that are permitted using one of the first wireless communication scheme and the second wireless communication scheme.

7. The base station of claim 6, wherein the first wireless communication scheme comprises a Wideband Code Division Multiple Access (WCDMA) type radio access technology and the second wireless communication scheme comprises a Long Term Evolution (LTE) type radio access technology.

8. The base station of claim 1, wherein the communication load for the first wireless communication scheme is determined based on a ratio of the communication count and the maximum communication count associated with the first wireless communication scheme, and the communication load for the second wireless communication scheme is determined based on a ratio of the communication count and the maximum communication count associated with the second wireless communication scheme.

9. A wireless communication system comprising:
    a mobile station configured to support first and second wireless communication schemes; and
    a base station configured to communicate with the mobile station, wherein:
    the base station is configured to estimate communication loads of the first and second wireless communication schemes based on a communication count and a maximum communication count, the communication count being configured to indicate a number of communications that have been performed by an automatic call from the mobile station, the automatic call being different from a user call from the mobile station, and the maximum communication count being configured to indicate a maximum number of possible communications that are performed by the automatic call;
    the base station is configured to notify the mobile station of a priority communication scheme selected between the first and second wireless communication schemes, the priority communication scheme having a low communication load between the estimated communication loads; and
    the mobile station is configured to use the priority communication scheme notified by the base station in a standby state caused by the automatic call.

10. A method for performing wireless communication by a base station that communicates with a mobile station configured to perform communication by means of first and second wireless communication schemes, the method comprising:
    estimating communication loads of the first and second wireless communication schemes, based on a communication count and a maximum communication count, the communication count being configured to indicate a number of communications that have been performed by an automatic call from the mobile station, the automatic call being different from a user call from the mobile station, and the maximum communication count being configured to indicate a maximum number of possible communications that are performed by the automatic call; and
    notifying the mobile station of a priority communication scheme selected between the first and second wireless communication schemes, the priority communication scheme having a low communication load between the estimated communication loads.

* * * * *